US012414216B2

(12) United States Patent
Tokita

(10) Patent No.: US 12,414,216 B2
(45) Date of Patent: Sep. 9, 2025

(54) STATIC ELIMINATOR

(71) Applicant: Keyence Corporation, Osaka (JP)

(72) Inventor: Yuki Tokita, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 222 days.

(21) Appl. No.: 18/230,232

(22) Filed: Aug. 4, 2023

(65) Prior Publication Data

US 2024/0080959 A1 Mar. 7, 2024

(30) Foreign Application Priority Data

Sep. 7, 2022 (JP) ................................ 2022-142589

(51) Int. Cl.

| | |
|---|---|
| ***H02H 1/00*** | (2006.01) |
| ***H02H 1/04*** | (2006.01) |
| ***H02H 3/22*** | (2006.01) |
| ***H05F 3/00*** | (2006.01) |
| ***H05F 3/02*** | (2006.01) |
| ***H05F 3/04*** | (2006.01) |

(52) U.S. Cl.

CPC ................ *H05F 3/02* (2013.01); *H05F 3/04* (2013.01)

(58) Field of Classification Search

CPC ................ H05F 3/02; H05F 3/04; H05F 3/06

USPC ........................................................ 361/212

See application file for complete search history.

(56) References Cited

U.S. PATENT DOCUMENTS

| | | | | |
|---|---|---|---|---|
| 7,649,728 B2 | 1/2010 | Fujita et al. | | |
| 7,898,790 B2 * | 3/2011 | Orihara | B03C 3/32 | 361/231 |
| 8,587,917 B2 | 11/2013 | Fujita | | |
| 2013/0335888 A1 * | 12/2013 | Cavazos | H01H 71/70 | 361/624 |

FOREIGN PATENT DOCUMENTS

| | | |
|---|---|---|
| JP | 10-289796 A | 10/1998 |
| JP | 2007258108 A | 10/2007 |

OTHER PUBLICATIONS

U.S. Appl. No. 18/230,223, filed Aug. 4, 2023 (75 pages).
U.S. Appl. No. 18/230,238, filed Aug. 4, 2023 (109 pages).
U.S. Appl. No. 18/230,243, filed Aug. 4, 2023 (98 pages).

* cited by examiner

*Primary Examiner* — Jared Fureman
*Assistant Examiner* — Lucy M Thomas
(74) *Attorney, Agent, or Firm* — Kilyk & Bowersox, P.L.L.C.

(57) ABSTRACT

To suppress charging of a housing of a static eliminator while avoiding an influence on control of ion balance. In order to suppress the charging of the housing of the static eliminator, the housing is provided with a rear frame that is conductive. The rear frame is insulated from a placement surface of the static eliminator by an insulating member such as an insulating pad, an inner spacer, and an outer spacer, and movement of an electric charge from the rear frame to an earth via the placement surface is prevented. In addition, the rear frame is not connected to the earth, but is connected to a ground, that is, a wire electrically connected to each of a low-response detection circuit, a positive polarity high voltage power supply, and a negative polarity high voltage power supply.

11 Claims, 20 Drawing Sheets

STATIC ELIMINATOR

CROSS-REFERENCE TO RELATED APPLICATIONS

The present application claims foreign priority based on Japanese Patent Application No. 2022-142589, filed Sep. 7, 2022, the contents of which are incorporated herein by reference.

BACKGROUND OF THE INVENTION

1. Field of the Invention

The invention relates to a technique for suppressing charging of a housing of a static eliminator that releases ions to an object for static elimination of the object.

2. Description of Related Art

JP H10-289796 A discloses a static eliminator that applies positive and negative high voltages to positive and negative electrode needles, respectively, to generate a corona discharge, thereby generating positive ions and negative ions. In order to reliably eliminate static electricity of an object by such a static eliminator, it is important to equally balance a generation amount of positive ions and a generation amount of negative ions. Therefore, this static eliminator includes a detection resistor that detects a current flowing between the static eliminator and an earth, and performs feedback control on the positive and negative high voltages applied to the positive and negative electrode needles based on a voltage generated in the detection resistor.

As a result, it is possible to suppress a difference between the generation amount of positive ions and the generation amount of negative ions and to realize appropriate ion balance.

Meanwhile, in order to suppress charging of a housing of the static eliminator, the housing can be partially or entirely formed with a conductive member. However, when the conductive member is short-circuited to the earth, the detection of the current flowing between the static eliminator and the earth is affected by movement of an electric charge from the conductive member to the earth, and there is a possibility that the ion balance cannot be appropriately controlled.

SUMMARY OF THE INVENTION

The invention has been made in view of the above problem, and an object thereof is to provide a technique capable of suppressing charging of a housing of a static eliminator while avoiding an influence on control of ion balance.

According to one embodiment of the invention, a static eliminator that releases ions to an object to eliminate static electricity of the object, the static eliminator including: an ion generator that generates a corona discharge in response to application of a positive polarity high voltage to generate positive ions, and generates a corona discharge in response to application of a negative polarity high voltage to generate negative ions; a high voltage application unit that applies the positive polarity high voltage and the negative polarity high voltage to the ion generator; a ground electrode short-circuited to an earth; a detection circuit that detects an ion current flowing between the earth and the static eliminator via the ground electrode; a feedback control unit that executes feedback control on the high voltage application unit to make the ion current detected by the detection circuit be a predetermined target value; a wire electrically connected to each of the detection circuit and the high voltage application unit; and a housing having a conductive member, which is insulated from a placement surface on which the static eliminator is placed and electrically connected to the wire, the housing accommodating the detection circuit.

In the invention (static eliminator) configured as described above, the ion generator generating the positive ions and the negative ions, and the high voltage application unit applying the positive polarity high voltage and the negative polarity high voltage to the ion generator are provided. Then, the ion generator generates the positive ions when the high voltage application unit applies the positive polarity high voltage to the ion generator, and the ion generator generates the negative ions when the high voltage application unit applies the negative polarity high voltage to the ion generator. Further, the ion current flowing between the earth and the static eliminator via the ground electrode is detected, and the feedback control is executed on the high voltage application unit such that the ion current has the predetermined target value. The feedback control based on the ion current enables appropriate control of ion balance. Further, in order to suppress charging of the housing of the static eliminator, the housing is provided with the conductive member. The conductive member is insulated from the placement surface of the static eliminator, so that an electric charge can be prevented from moving from the conductive member to the earth via the placement surface. In addition, the conductive member is connected not to the earth but to a wire electrically connected to each of the detection circuit and the high voltage application unit. As a result, the electric charge of the conductive member is absorbed by the high voltage application unit, so that the electric charge can be prevented from moving from the conductive member to the earth. As a result, it is possible to suppress the charging of the housing of the static eliminator while avoiding an influence on the control of the ion balance.

As described above, it is possible to suppress the charging of the housing of the static eliminator while avoiding the influence on the control of the ion balance according to the invention.

DETAILED DESCRIPTION OF PREFERRED EMBODIMENTS

Figure 1:
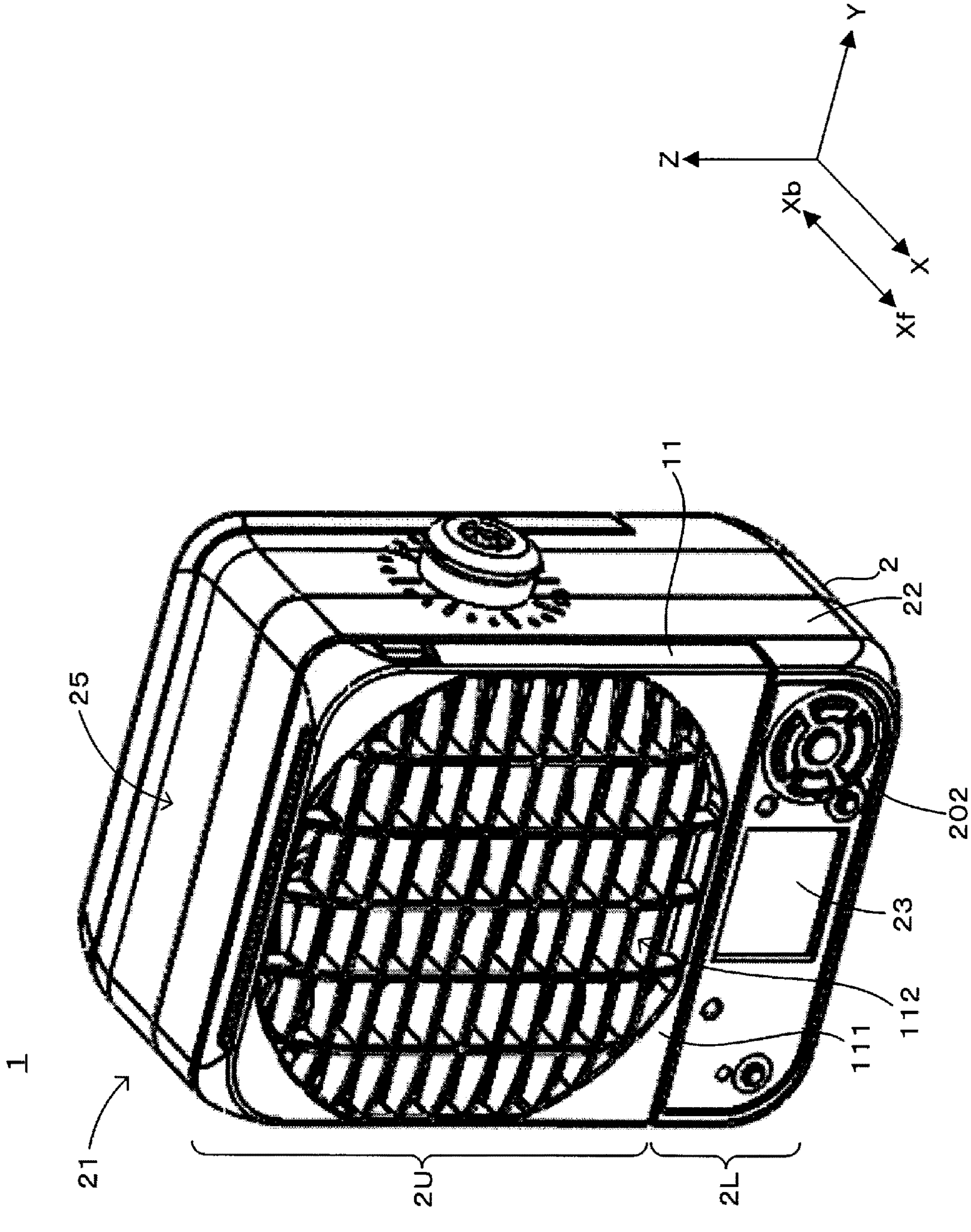
FIG. 1 is a front perspective view illustrating an appearance of an example of a static eliminator according to the invention.
Figure 2:
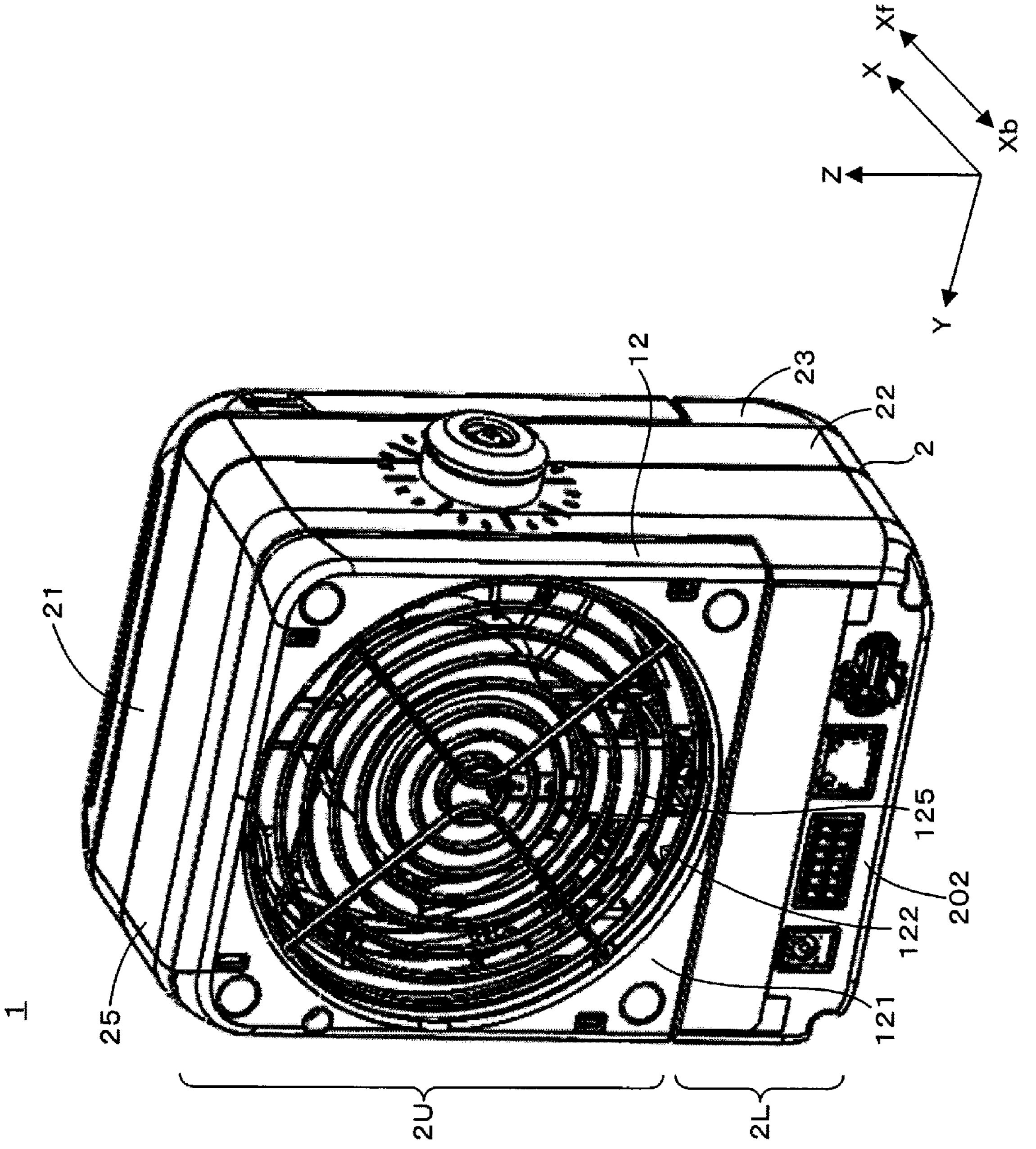
FIG. 2 is a rear perspective view illustrating an appearance of the example of the static eliminator of FIG. 1.
Figure 3:
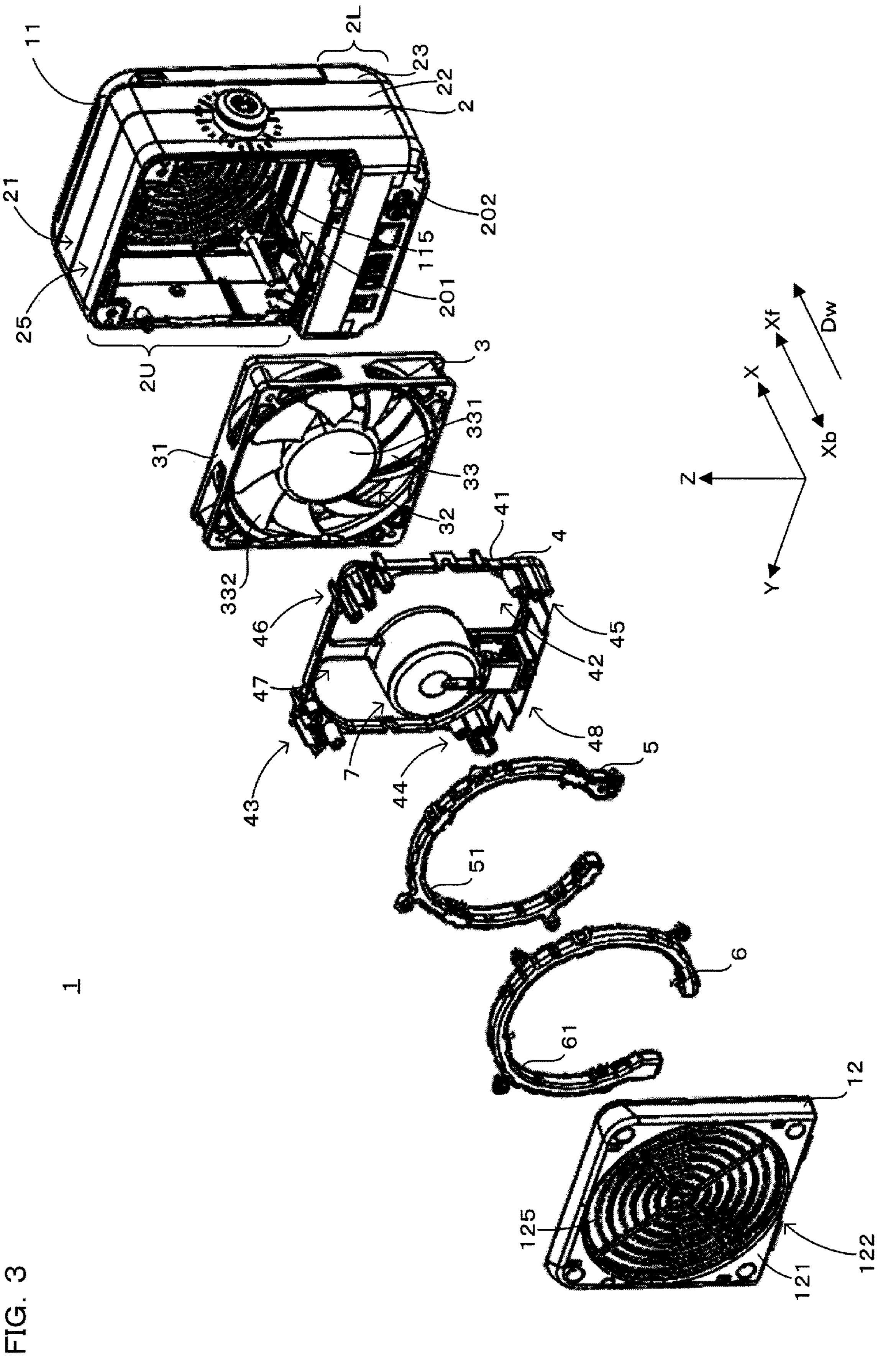
FIG. 3 is an exploded perspective view of the example of the static eliminator of FIG. 1.
Figure 4:
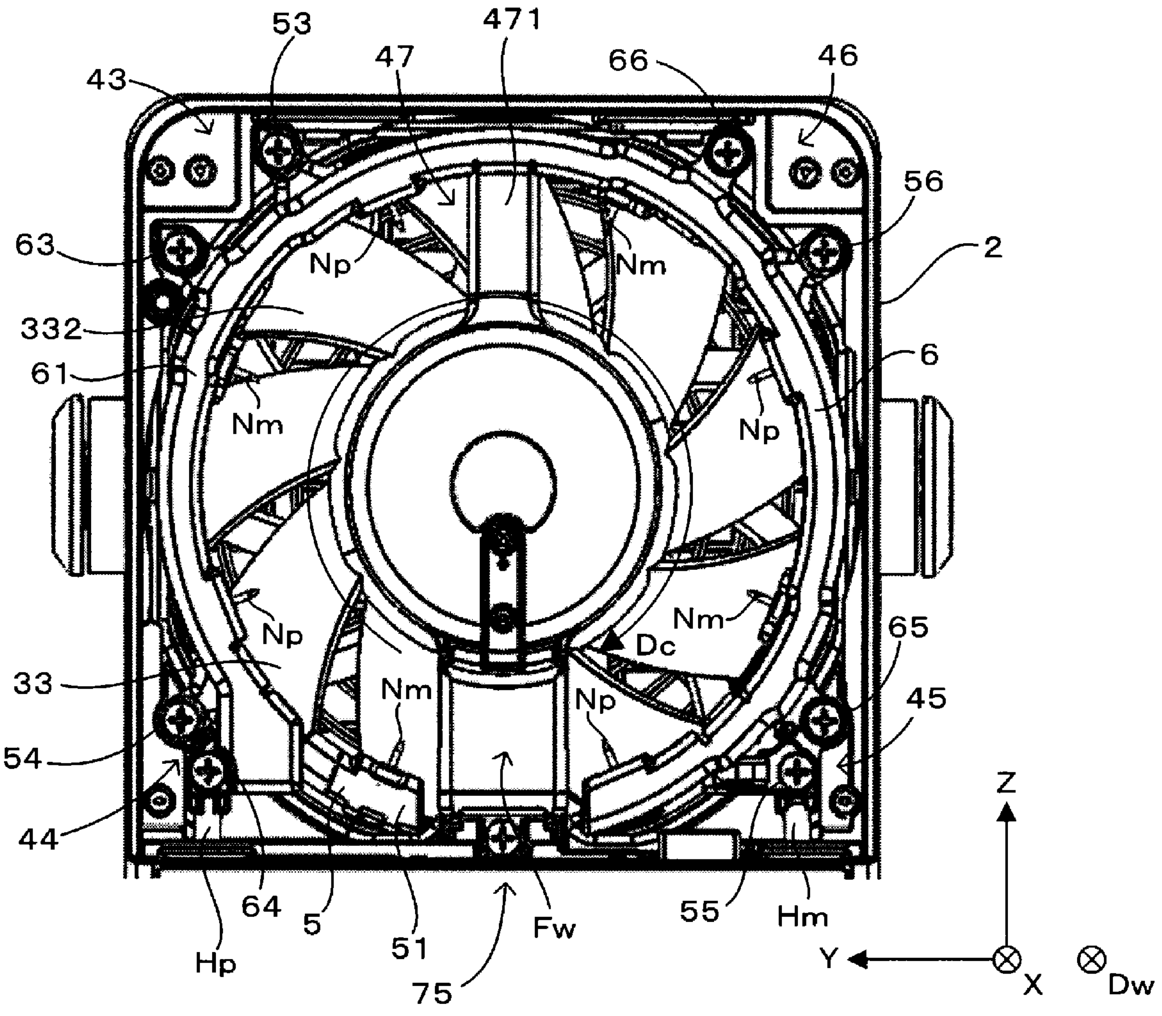
FIG. 4 is a rear view illustrating the inside of the static eliminator of FIG. 1.

FIG. 1 is a front perspective view illustrating an appearance of an example of a static eliminator according to the invention; FIG. 2 is a rear perspective view illustrating an appearance of the example of the static eliminator of FIG. 1; FIG. 3 is an exploded perspective view of the example of the static eliminator of FIG. 1; and FIG. 4 is a rear view illustrating the inside of the static eliminator of FIG. 1. Note that in the present specification, description will be given while appropriately indicating an X direction which is the horizontal direction, a Y direction which is the horizontal direction orthogonal to the X direction, and a Z direction which is the vertical direction. Further, one of both sides in the X direction is appropriately referred to as a front side Xf, and the other side is appropriately referred to as a rear side Xb.

A static eliminator 1 includes a front cover 11, a housing 2, a fan unit 3, a fixing base 4, a negative electrode unit 5, a positive electrode unit 6, a cleaning unit 7, and a rear cover 12. The housing 2 is roughly divided into an upper part 2U and a lower part 2L provided on the lower side of the upper part 2U. An accommodation chamber 201 is provided in the upper part 2U of the housing 2, and an electrical equipment accommodating portion 202 is provided in the lower part 2L of the housing 2. The accommodation chamber 201 has a rectangular shape as viewed from the X direction and is open in the X direction. The fan unit 3, the fixing base 4, the negative electrode unit 5, the positive electrode unit 6, and the cleaning unit 7 are arrayed in the X direction and accommodated in the accommodation chamber 201. The electrical equipment accommodating portion 202 accommodates an electrical equipment system of the static eliminator 1. Further, the front cover 11 is attached to the housing 2 from the front side Xf so as to oppose the accommodation chamber 201, and the rear cover 12 is attached to the housing 2 from the rear side Xb so as to oppose the accommodation chamber 201.

The housing 2 includes a front frame 21 and a rear frame 25 provided on the rear side Xb of the front frame 21. The front frame 21 and the rear frame 25 are arrayed in the X direction and attached to each other. The front frame 21 and the rear frame 25 are made of an antistatic resin and are electrically conductive. The antistatic resin can be formed by kneading an antistatic agent into a resin or coating a surface of a resin with an antistatic agent. The antistatic resin in the present embodiment is a resin having such a resistance value that an electric charge generated on a surface of the housing 2 flows to a ground G in a relatively short time, for example, several seconds when the housing 2 is made of the resin. An experimental result in which the electric charge generated on the surface of the housing 2 flows to the ground G in several seconds has been obtained when the housing 2 is made of a resin having a resistance value in the range of $10^9\Omega$ to $10^{12}\Omega$. Further, it is sufficient that most of an outer surface of the housing 2 is made of the antistatic resin. In the present embodiment, a display section 23 is not made of the antistatic resin, but charging of a part of the housing 2 has a small influence.

The front frame 21 includes a main frame 22 and the display section 23 provided on the front side Xf of the main frame 22. The main frames 22 and the display section 23 are arrayed in the X direction and attached to each other. The main frame 22 is open in the X direction. The display section 23 is provided in an opening of the main frame 22 in the lower part 2L and is arranged so as to be visually recognizable from the front side Xf. That is, the opening of the main frame 22 in a range of the upper part 2U constitutes a part of the accommodation chamber 201. Further, the main frame 22 in a range of the lower part 2L constitutes a part of the electrical equipment accommodating portion 202.

The rear frame 25 is open in the X direction. An opening of the rear frame 25 in a range of upper part 2U constitutes a part of the accommodation chamber 201. Further, the rear frame 25 in a range of the lower part 2L constitutes a part of the electrical equipment accommodating portion 202.

The front cover 11 includes a cover frame 111 made of an antistatic resin, and the cover frame 111 is attached to the front frame 21 of the housing 2 from the front side Xf in the upper part 2U. The cover frame 111 covers the accommodation chamber 201 from the front side Xf. Further, the cover frame 111 includes a mesh portion 112 provided with a plurality of slits, and the mesh portion 112 opposes the accommodation chamber 201 from the front side Xf. Further, a front wire mesh 115 (metal mesh) having a circular shape as viewed from the X direction is attached to the front frame 21. The front wire mesh 115 opposes the accommodation chamber 201 from the front side Xf and opposes the mesh portion 112 from the rear side Xb. The mesh portion 112 and the front wire mesh 115 allow passage of air in the X direction. Note that the cover frame 111 has the mesh portion 112 provided with the plurality of slits in the present embodiment, but may have any shape that can guide air generated by a fan 33, which will be described later, to a desired region. Further, the front cover 11 is attached to the housing 2, but a configuration in which the front cover 11 selected from a plurality of the front covers 11 having different shapes of the cover frame 111 is attached to the housing 2 may be adopted. According to this configuration, a user can attach the front cover 11 selected according to a use environment of the static eliminator 1 to the housing 2. For example, it is possible to attach the front cover 11 suitable for guiding the air to the vicinity in a case where a distance between the static eliminator 1 and an object to be neutralized is short and to attach the front cover 11 suitable for guiding the air far away in a case where the distance between the static eliminator 1 and the object to be neutralized is long. Furthermore, in the configuration in which the front cover 11 is switchable, a parameter regarding the operation of the static eliminator 1 may be set according to a type of the front cover 11 attached to the housing 2.

Figure 9:
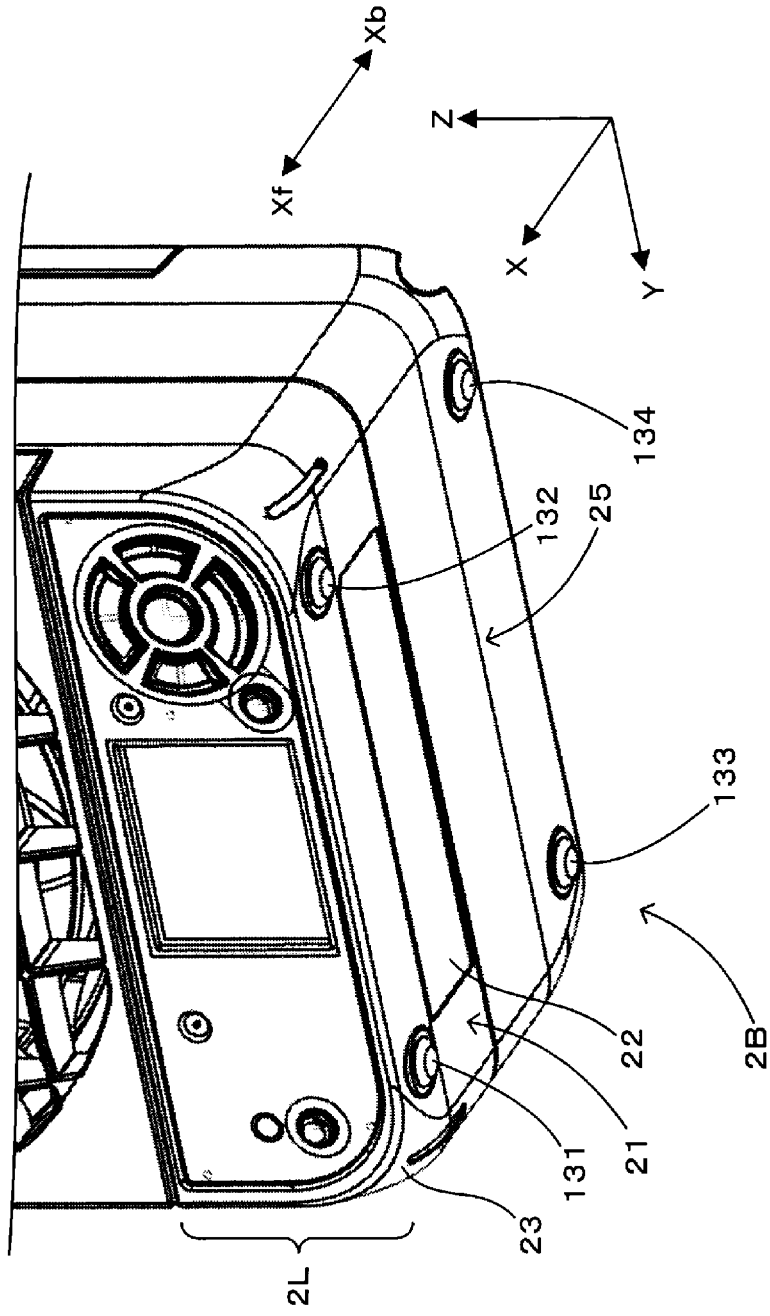
FIG. 9 is a lower perspective view illustrating a bottom surface of the static eliminator of FIG. 1.

The rear cover 12 includes a cover frame 121 made of an antistatic resin, and the cover frame 121 is attached to the rear frame 25 of the housing 2 from the rear side Xb in the upper part 2U. The cover frame 111 has an opening 122 having a circular shape as viewed from the X direction, and the opening 122 opposes the accommodation chamber 201 from the rear side Xb. Furthermore, the rear cover 12 includes a rear wire mesh 125 (metal mesh) having a circular shape as viewed from the X direction. The rear wire mesh 125 is fitted into the opening 122 and attached to the cover frame 121, and opposes the accommodation chamber 201 from the rear side Xb. The rear wire mesh 125 allows passage of air in the X direction. Further, the rear wire mesh 125 is short-circuited to the ground G (FIG. 9). Note that a mode of electrically connecting the rear wire mesh 125 and the ground G is not limited to the short circuit, and these may be connected via a resistor.

The fan unit 3 is arranged in the accommodation chamber 201 of the housing 2 and is located on the rear side Xb of the front wire mesh 115 of the front cover 11. The fan unit 3 includes a support frame 31 having a rectangular shape as viewed from the X direction, and the support frame 31 is arranged in the accommodation chamber 201 and attached to the housing 2. In the support frame 31, a ventilation opening 32 having a circular shape as viewed from the X direction is open in the X direction. The ventilation opening 32 opposes the front wire mesh 115 of the front cover 11 from the rear side Xb. Furthermore, the fan unit 3 includes the fan 33 having a circular shape as viewed from the X direction. The fan 33 includes a rotating shaft 331 provided parallel to the X direction and a plurality of blades 332 provided around the rotating shaft 331. Further, the fan 33 is arranged in the ventilation opening 32 of the support frame 31 and opposes the front wire mesh 115 of the front cover 11 from the rear side Xb. The fan 33 is supported by the support frame 31 so as to be rotatable about a rotation center parallel to the X direction, and rotates about the rotation center, thereby generating air (in other words, air flow) in an air blowing direction Dw from the rear side Xb toward the front side Xf in the X direction.

The fixing base 4 is arranged in the accommodation chamber 201 of the housing 2 and is located on the rear side Xb of the fan unit 3. The fixing base 4 includes a fixing frame 41 having a rectangular shape as viewed from the X direction, and the fixing frame 41 is arranged in the accommodation chamber 201 and attached to the housing 2. In the fixing frame 41, a ventilation opening 42 is open in the X direction. The ventilation opening 42 has a rectangular shape whose four corners are cut out in an arc shape as viewed from the X direction. Further, the fixing base 4 includes fixing portions 43, 44, 45, and 46 provided at four corners of the fixing frame 41. The fixing portions 43, 44, 45, and 46 are located on the outer side of the four corners of the ventilation opening 42, respectively. Furthermore, the fixing base 4 has an I-shaped part that supports the cleaning unit 7 with respect to the fixing frame 41 as will be described later.

Figure 5A:
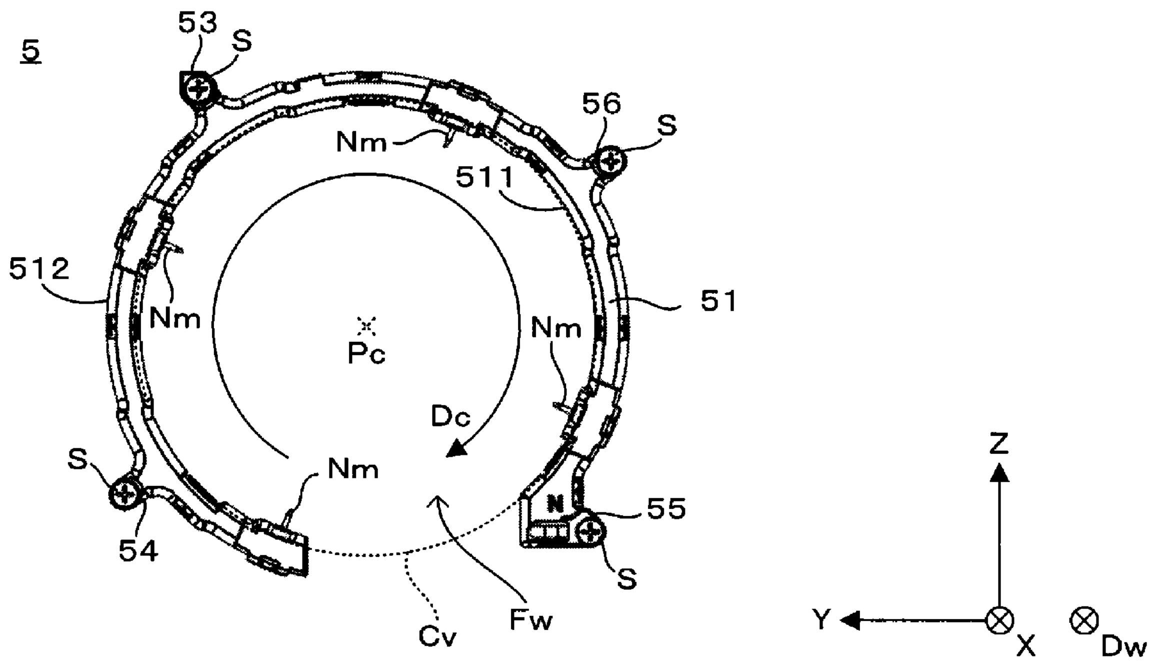
FIG. 5A is a rear view illustrating an example of a negative electrode unit.

The negative electrode unit 5 is arranged in the accommodation chamber 201 of the housing 2 and is fixed to the fixing frame 41 of the fixing base 4 from the rear side Xb. The negative electrode unit 5 has a configuration illustrated in FIG. 5A. FIG. 5A is a rear view illustrating an example of the negative electrode unit. FIG. 5A illustrates a virtual circle Cv (a circle indicated by a broken line) having a circular shape centered on a center point Pc as viewed from the X direction, and a circumferential direction Dc centered on the center point Pc.

As illustrated in FIG. 5A, the negative electrode unit 5 includes a first unit frame 51 provided along the virtual circle Cv. In other words, the first unit frame 51 has an arc shape along the virtual circle Cv. Furthermore, the negative electrode unit 5 has a plurality of (four) electrode needles Nm arrayed at a constant array pitch (90 degrees) in the circumferential direction Dc along the virtual circle Cv. The plurality of electrode needles Nm are arrayed along an inner wall 511 of the first unit frame 51 and protrude inward (in other words, to the center point Pc side of the virtual circle Cv) from the inner wall 511. A cable (wire) electrically connected to each of the electrode needles Nm is built in the first unit frame 51, and a voltage is applied to each of the electrode needles Nm through the cable.

Further, the negative electrode unit 5 has a plurality of (four) fixing portions 53, 54, 55, and 56 arrayed at a constant array pitch (90 degrees) in the circumferential direction Dc. In this example, the number of the electrode needles Nm is equal to the number of the fixing portions 53, 54, 55, and 56. The plurality of fixing portions 53, 54, 55, and 56 are arrayed along an outer wall 512 of the first unit frame 51, and protrude outward (in other words, to the opposite side of the center point Pc of the virtual circle Cv) from the outer wall 512. In the circumferential direction Dc, a phase of the array of the plurality of fixing portions 53, 54, 55, and 56 is shifted from a phase of the array of the plurality of electrode needles Nm. That is, the fixing portions 53, 54, 55, and 56 are provided at positions shifted from the electrode needles Nm in the circumferential direction Dc. The fixing portions 53, 54, 55, and 56 are respectively fastened to the fixing portions 43, 44, 45, and 46 of the fixing base 4 by screws S.

The air generated by the fan 33 of the fan unit 3 described above passes through a flow path Fw surrounded by the first unit frame 51 of the negative electrode unit 5 in the air blowing direction Dw. In other words, the first unit frame 51 of the negative electrode unit 5 has a curved shape (arc shape) so as to surround the flow path Fw through which the air generated by the fan 33 passes.

Figure 5B:
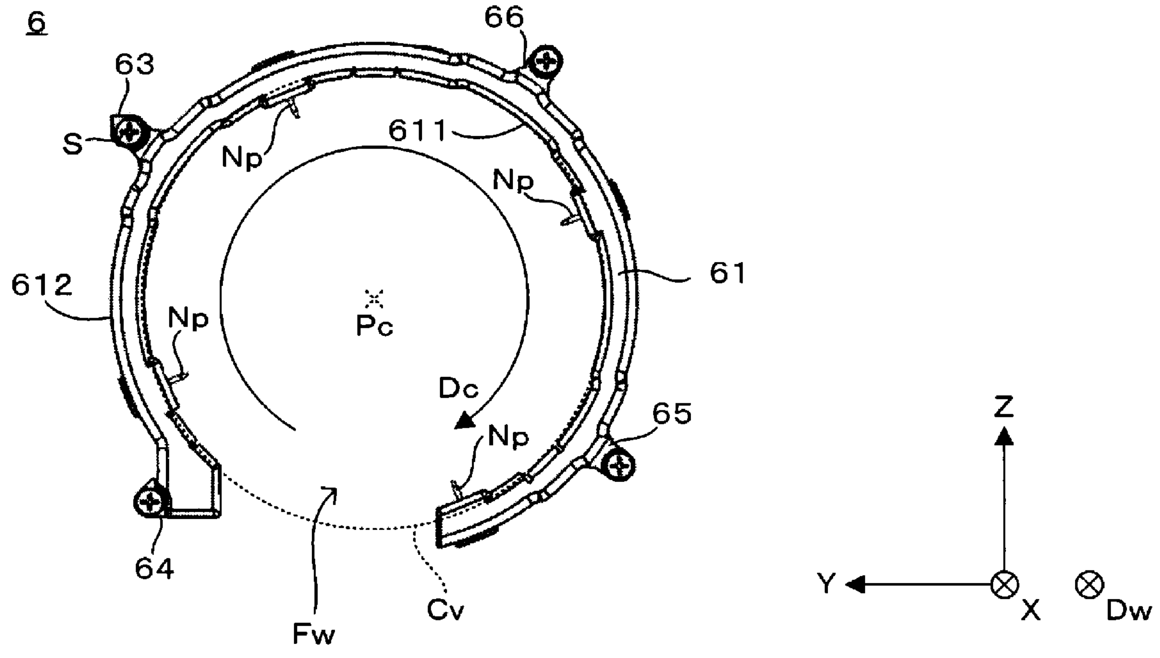
FIG. 5B is a rear view illustrating an example of a positive electrode unit.

As illustrated in FIG. 3, the positive electrode unit 6 is arranged in the accommodation chamber 201 of the housing 2 and is fixed to the fixing frame 41 of the fixing base 4 from the rear side Xb. The positive electrode unit 6 has a configuration illustrated in FIG. 5B. FIG. 5B is a rear view illustrating an example of the positive electrode unit. FIG. 5B illustrates the virtual circle Cv and the circumferential direction Dc similarly to FIG. 5A.

As illustrated in FIG. 5B, the positive electrode unit 6 includes a second unit frame 61 provided along the virtual circle Cv. In other words, the second unit frame 61 has an arc shape along the virtual circle Cv. Furthermore, the positive electrode unit 6 has a plurality of (four) electrode needles Np arrayed at a constant array pitch (90 degrees) in the circumferential direction Dc along the virtual circle Cv. The plurality of electrode needles Np are arrayed along an inner wall 611 of the second unit frame 61 and protrude inward (in other words, to the center point Pc side of the virtual circle Cv) from the inner wall 611. A cable (wire) electrically connected to each of the electrode needles Np is built in the second unit frame 61, and a voltage is applied to each of the electrode needles Np through the cable.

Further, the positive electrode unit 6 has a plurality of (four) fixing portions 63, 64, 65, and 66 arrayed at a constant array pitch (90 degrees) in the circumferential direction Dc. In this example, the number of the electrode needles Np is equal to the number of the fixing portions 63, 64, 65, and 66. The plurality of fixing portions 63, 64, 65, and 66 are arrayed along an outer wall 612 of the second unit frame 61, and protrude outward (in other words, to the opposite side of the center point Pc of the virtual circle Cv) from the outer wall 612. In the circumferential direction Dc, a phase of the array of the plurality of fixing portions 63, 64, 65, and 66 is shifted from a phase of the array of the plurality of electrode needles Np. That is, the fixing portions 63, 64, 65, and 66 are provided at positions shifted from the electrode needles Np in the circumferential direction Dc. The fixing portions 63, 64, 65, and 66 are respectively fastened to the fixing portions 43, 44, 45, and 46 of the fixing base 4 by screws S.

The air generated by the fan 33 of the fan unit 3 described above passes through the flow path Fw surrounded by the second unit frame 61 of the positive electrode unit 6 in the air blowing direction Dw. In other words, the second unit frame 61 of the positive electrode unit 6 has a curved shape (arc shape) so as to surround the flow path Fw through which the air generated by the fan 33 passes.

The negative electrode unit 5 and the positive electrode unit 6 are arrayed in the X direction in the accommodation chamber 201, and the positive electrode unit 6 is arranged on the rear side Xb of the negative electrode unit 5. Further, the negative electrode unit 5 and the positive electrode unit 6 are fixed to the fixing base 4 such that the first unit frame 51 of the negative electrode unit 5 and the second unit frame 61 of the positive electrode unit 6 overlap each other as viewed from the X direction. It is sufficient that the fixing base 4 is a member that fixes the negative electrode unit 5 and the positive electrode unit 6 so as to have a desired arrangement relationship, and the fixing base 4 may be configured using a single member or a plurality of members. Further, another member such as a member constituting the housing 2 may also be configured to serve as the fixing base 4.

Figure 6A:
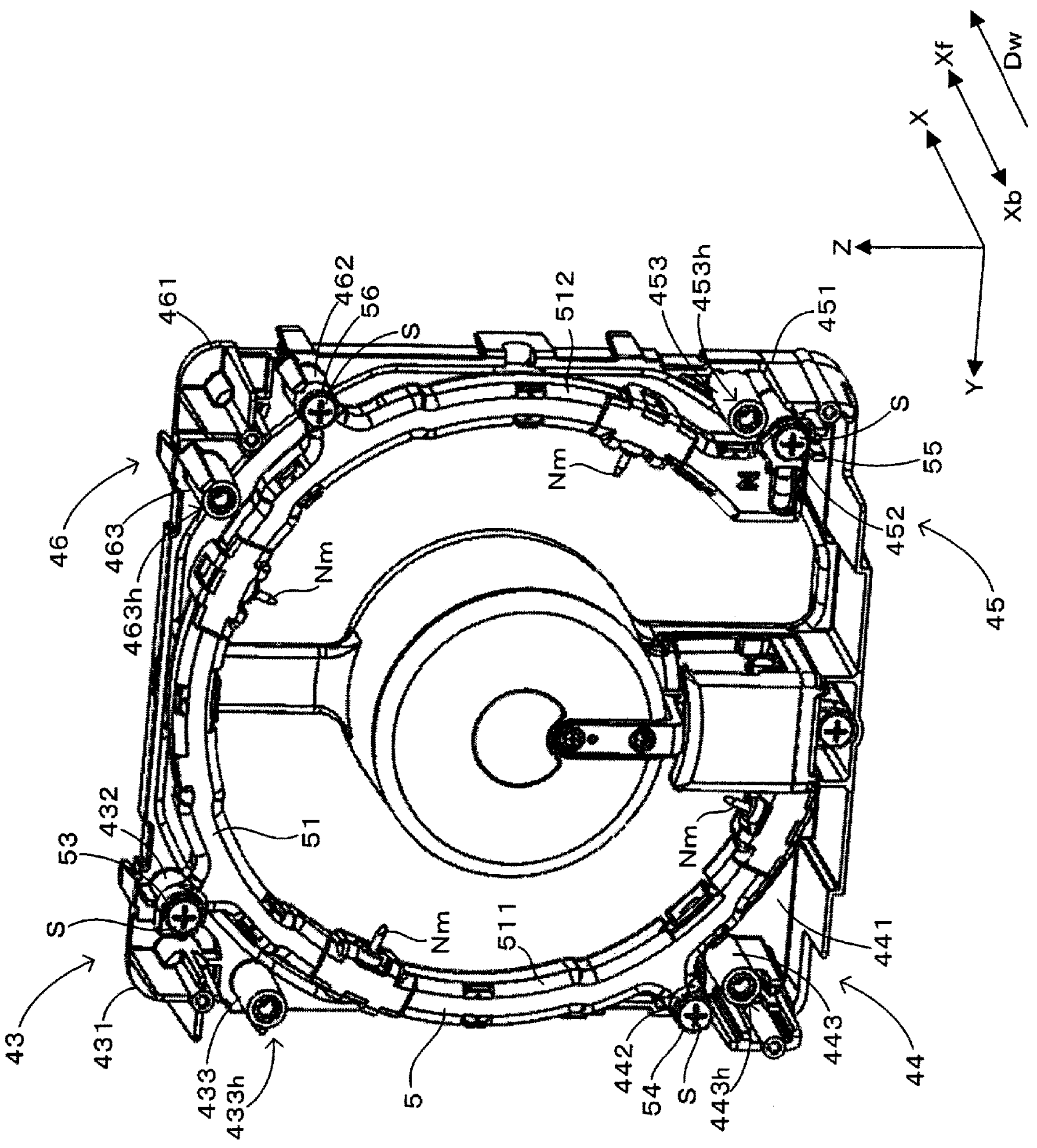
FIG. 6A is a rear perspective view illustrating a mode of fixing the negative electrode unit to a fixing base.
Figure 6B:
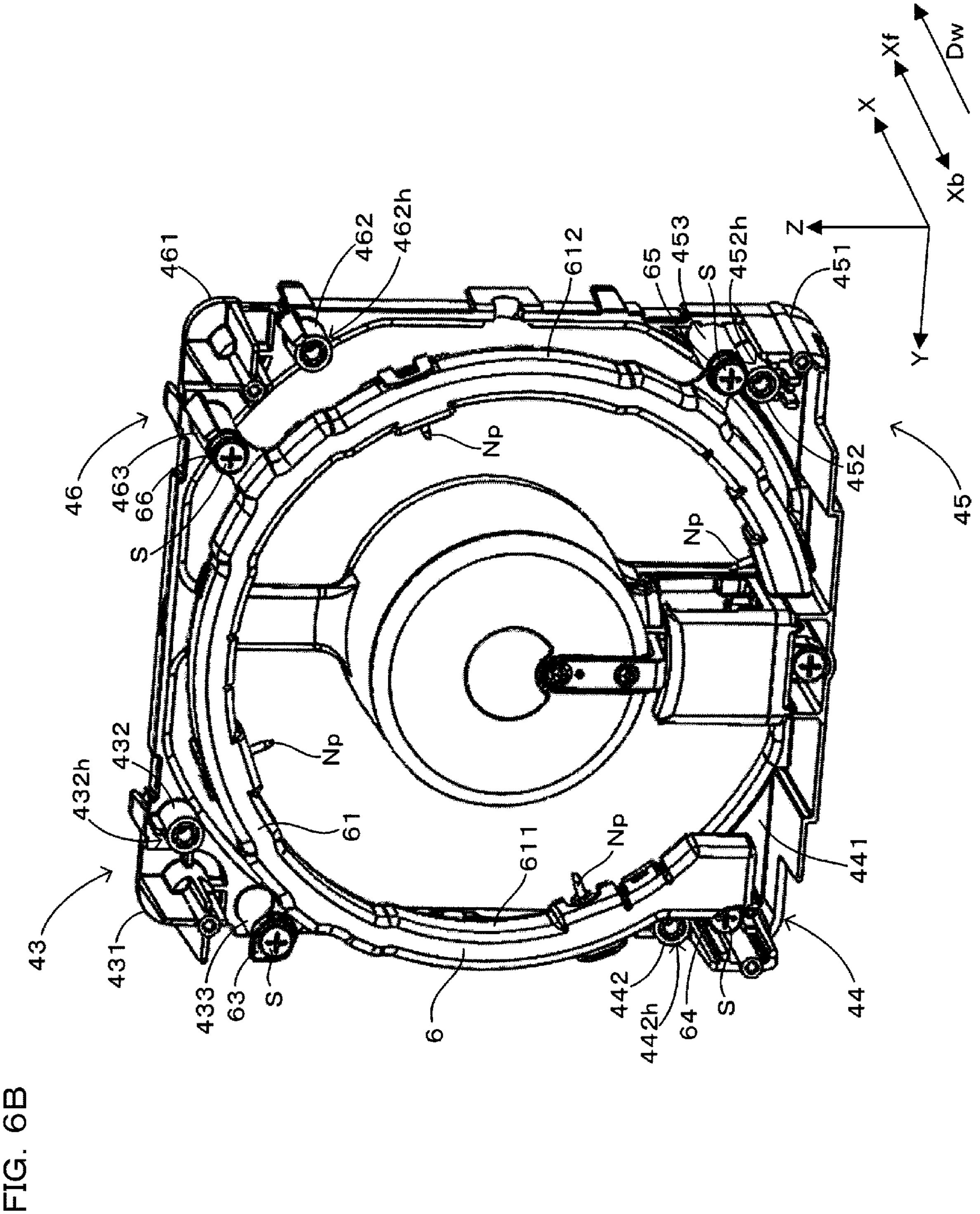
FIG. 6B is a rear perspective view illustrating a mode of fixing the positive electrode unit to the fixing base.
Figure 6C:
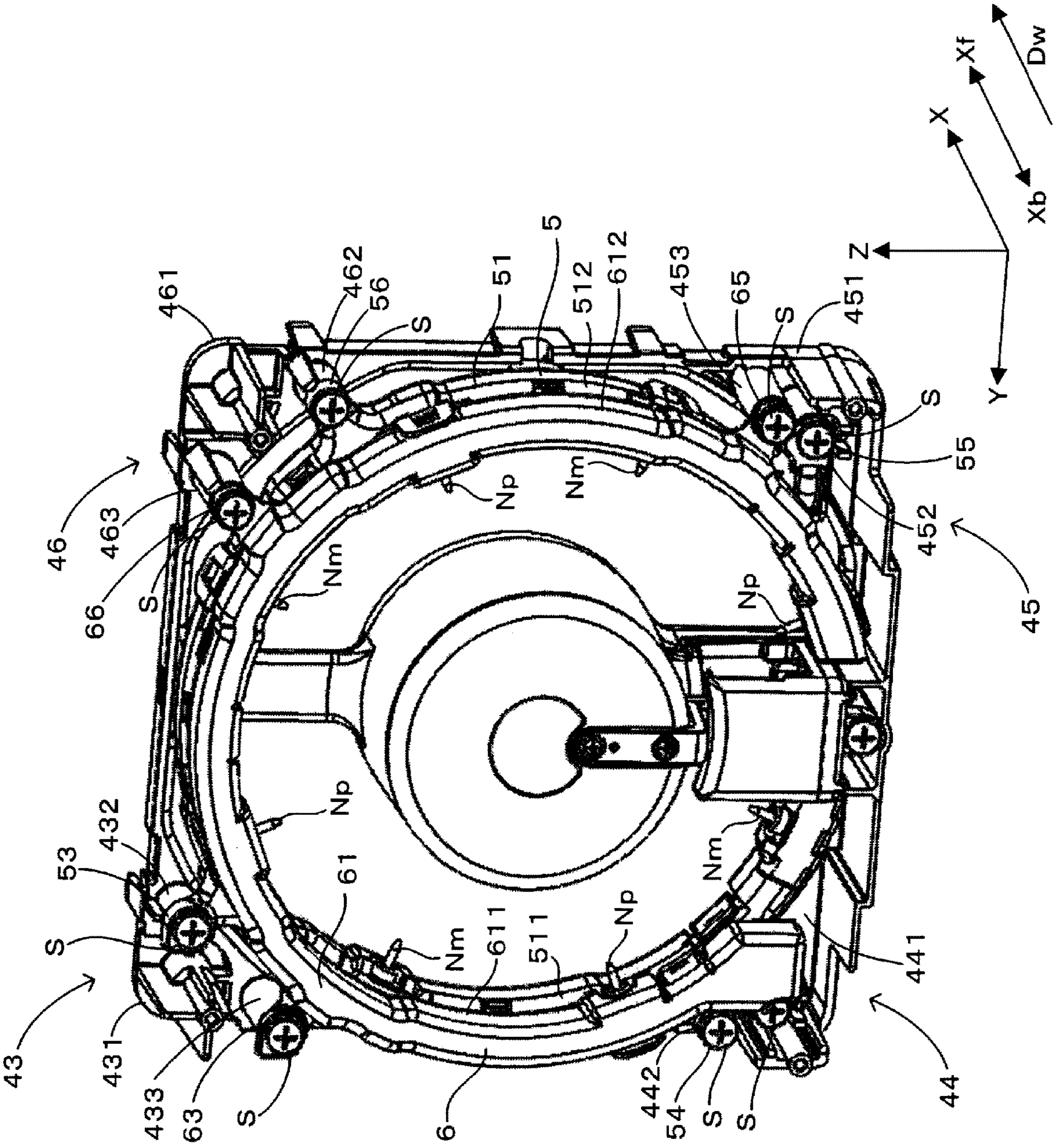
FIG. 6C is a rear perspective view illustrating a mode of fixing the negative electrode unit and the positive electrode unit to the fixing base.
Figure 6D:
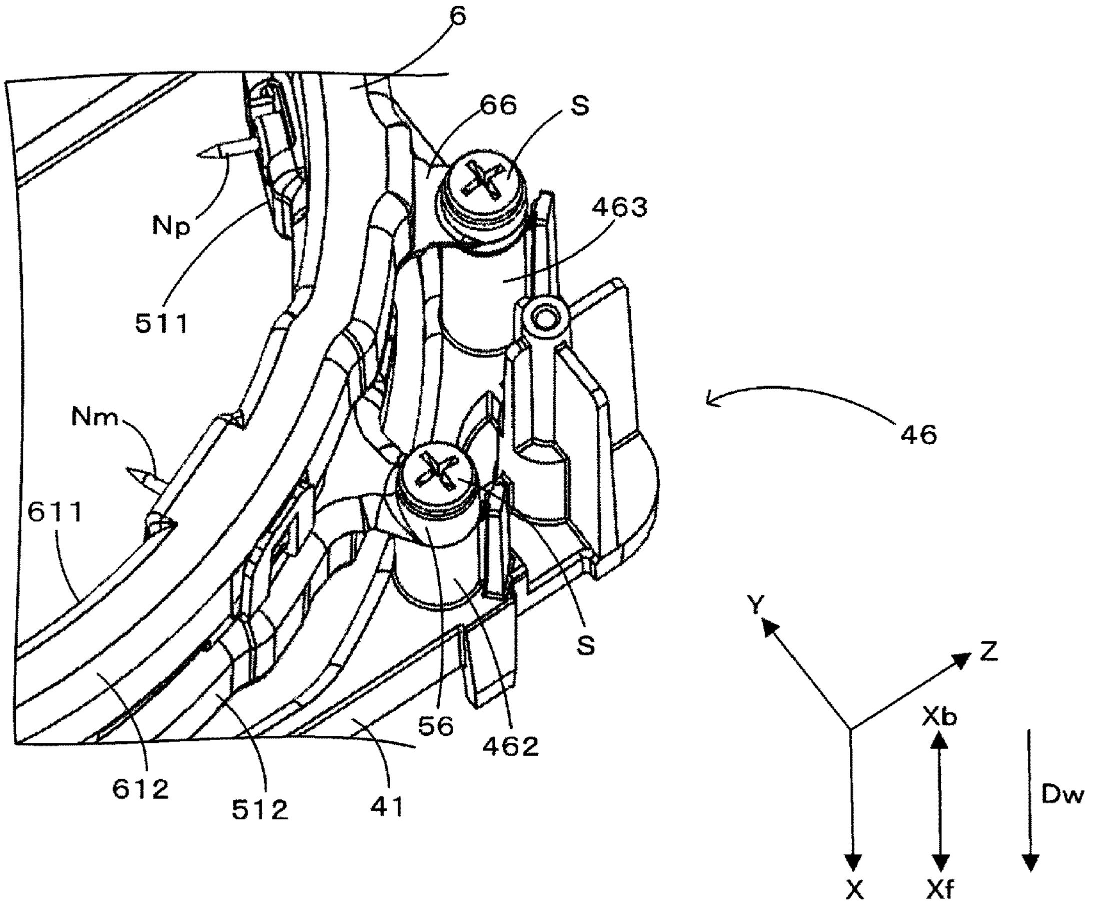
FIG. 6D is an enlarged perspective view illustrating the mode of fixing the negative electrode unit and the positive electrode unit to the fixing base in an enlarged manner.

FIG. 6A is a rear perspective view illustrating a mode of fixing the negative electrode unit to the fixing base; FIG. 6B is a rear perspective view illustrating a mode of fixing the positive electrode unit to the fixing base; FIG. 6C is a rear perspective view illustrating a mode of fixing the negative electrode unit and the positive electrode unit to the fixing base; and FIG. 6D is an enlarged perspective view illustrating the mode of fixing the negative electrode unit and the positive electrode unit to the fixing base in an enlarged manner.

The fixing portion 43 has a protruding plate 431 protruding outward from the first and second unit frames 51 and 61 as viewed from the X direction. The protruding plate 431 protrudes to the upper left side from the first and second unit frames 51 and 61 in a rear view. Furthermore, the fixing portion 43 includes a fastening portion 432 protruding from the protruding plate 431 to the rear side Xb in the X direction and a fastening portion 433 protruding from the protruding plate 431 to the rear side Xb in the X direction. In the fastening portion 432, a screw hole **432*h* extending in the X direction is open to the rear side Xb. In the fastening portion 433, a screw hole 433*h* extending in the X direction is open to the rear side Xb. The screws S are screwed into the screw holes 432*h* and 433*h*. In the circumferential direction Dc, the fastening portion 432 and the fastening portion 433 are provided to be shifted from each other, and the fastening portion 432 is located on one side (clockwise side in the rear view) of the fastening portion 433**.

The fixing portion 44 has a protruding plate 441 protruding outward from the first and second unit frames 51 and 61 as viewed from the X direction. The protruding plate 441 protrudes to the lower left side from the first and second unit frames 51 and 61 in the rear view. Furthermore, the fixing portion 44 includes a fastening portion 442 protruding from the protruding plate 441 to the rear side Xb in the X direction and a fastening portion 443 protruding from the protruding plate 441 to the rear side Xb in the X direction. In the fastening portion 442, a screw hole **442*h* extending in the X direction is open to the rear side Xb. In the fastening portion 443, a screw hole 443*h* extending in the X direction is open to the rear side Xb. The screws S are screwed into the screw holes 442*h* and 443*h*. In the circumferential direction Dc, the fastening portion 442 and the fastening portion 443 are provided to be shifted from each other, and the fastening portion 442 is located on one side (clockwise side in the rear view) of the fastening portion 443**.

The fixing portion 45 has a protruding plate 451 protruding outward from the first and second unit frames 51 and 61 as viewed from the X direction. The protruding plate 451 protrudes to the lower right side from the first and second unit frames 51 and 61 in the rear view. Furthermore, the fixing portion 45 includes a fastening portion 452 protruding from the protruding plate 451 to the rear side Xb in the X direction and a fastening portion 453 protruding from the protruding plate 441 to the rear side Xb in the X direction. In the fastening portion 452, a screw hole **452*h* extending in the X direction is open to the rear side Xb. In the fastening portion 453, a screw hole 453*h* extending in the X direction is open to the rear side Xb. The screws S are screwed into the screw holes 452*h* and 453*h*. In the circumferential direction Dc, the fastening portion 452 and the fastening portion 453 are provided to be shifted from each other, and the fastening portion 452 is located on one side (clockwise side in the rear view) of the fastening portion 453**.

The fixing portion 46 has a protruding plate 461 protruding outward from the first and second unit frames 51 and 61 as viewed from the X direction. The protruding plate 461 protrudes to the upper right side from the first and second unit frames 51 and 61 in the rear view. Furthermore, the fixing portion 46 includes a fastening portion 462 protruding from the protruding plate 461 to the rear side Xb in the X direction and a fastening portion 463 protruding from the protruding plate 441 to the rear side Xb in the X direction. In the fastening portion 462, a screw hole **462*h* extending in the X direction is open to the rear side Xb. In the fastening portion 463, a screw hole 463*h* extending in the X direction is open to the rear side Xb. The screws S are screwed into the screw holes 462*h* and 463*h*. In the circumferential direction Dc, the fastening portion 462 and the fastening portion 463 are provided to be shifted from each other, and the fastening portion 462 is located on one side (clockwise side in the rear view) of the fastening portion 463**.

The fixing portions 53, 54, 55, and 56 of the negative electrode unit 5 are respectively fastened to the fastening portions 432, 442, 452, and 462 of the fixing base 4 with the screws S, respectively. Specifically, an insertion hole extending in the X direction is opened in the fixing portion 53. Then, the screw S inserted into the insertion hole of the fixing portion 53 is screwed into the screw hole 432*h* of the fastening portion 432 in a state in which the insertion hole of the fixing portion 53 adjacent to the fastening portion 432 from the rear side Xb opposes the screw hole 432*h* of the fastening portion 432 in the X direction. Thus, the fixing portion 53 is fastened to the fastening portion 432. Further, the fixing portions 54, 55, and 56 are similarly fastened.

The fixing portions 63, 64, 65, and 66 of the positive electrode unit 6 are fastened to the fastening portions 433, 443, 453, and 463 of the fixing base 4 with the screws S, respectively. Specifically, an insertion hole extending in the X direction is opened in the fixing portion 63. Then, the screw S inserted into the insertion hole of the fixing portion 63 is screwed into the screw hole 433*h* of the fastening portion 433 in a state in which the insertion hole of the fixing portion 63 adjacent to the fastening portion 433 from the rear side Xb opposes the screw hole 433*h* of the fastening portion 433 in the X direction. Thus, the fixing portion 63 is fastened to the fastening portion 433. Further, the fixing portions 64, 65, and 66 are similarly fastened.

Incidentally, the fastening portions 433, 443, 453, and 463 have the same length, and the fastening portions 432, 442, 452, and 462 have the same length. On the other hand, the fastening portions 433, 443, 453, and 463 are longer than the fastening portions 432, 442, 452, and 462. Therefore, the positive electrode unit 6 fastened to the fastening portions 433, 443, 453, and 463 is located on the rear side Xb of the negative electrode unit 5 fastened to the fastening portions 432, 442, 452, and 462. In particular, the lengths of the fastening portions 433, 443, 453, and 463 and the fastening portions 432, 442, 452, and 462 are set such that a gap is formed between the negative electrode unit 5 and the positive electrode unit 6 in the X direction.

Further, the number of the electrode needles Nm included in the negative electrode unit 5 and the number of the electrode needles Np included in the positive electrode unit 6 are equal (four), and the array pitch of the electrode needles Nm in the negative electrode unit 5 and the array pitch of the electrode needles Np in the positive electrode unit 6 are equal (90 degrees). On the other hand, for example, as illustrated in FIG. 4, a phase of the array of the plurality of electrode needles Nm in the negative electrode unit 5 and a phase of the array of the plurality of electrode needles Np in the positive electrode unit 6 are shifted by 45 degrees. Therefore, the electrode needles Np and the electrode needles Nm are alternately arrayed at a half pitch (45 degrees) that is half the array pitch as viewed from the X direction. The electrode needles Np and the electrode needles Nm are arrayed in the circumferential direction Dc so as to surround the flow path Fw of the air flowing in the air blowing direction Dw generated by the fan 33, and tip portions of the electrode needles Np and the electrode needles Nm protrude to the flow path Fw.

Figure 7A:
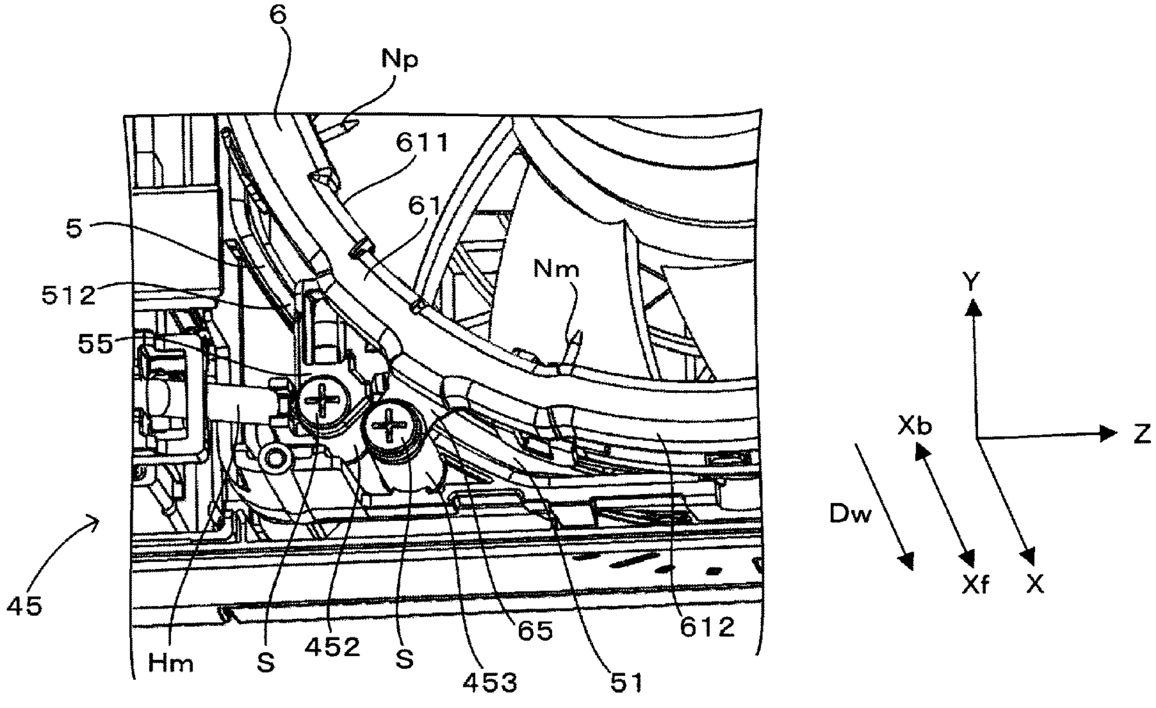
FIG. 7A is a perspective view illustrating a configuration in which a voltage is applied to the negative electrode unit.

FIG. 7A is a perspective view illustrating a configuration in which a voltage is applied to the negative electrode unit. The static eliminator 1 has a harness Hm, which extends from the electrical equipment system accommodated in the electrical equipment accommodating portion 202 to the fixing portion 55 of the negative electrode unit 5, and an electrode terminal is exposed at a tip of the harness Hm. Further, an electrode terminal of the cable electrically connected to the electrode needles Nm is exposed on a side surface on the front side Xf of the fixing portion 55. Then, the fixing portion 55 is fastened to the fastening portion 452 in a state in which the electrode terminal of the harness Hm is sandwiched between the fastening portion 452 and the electrode terminal of the fixing portion 55 of the negative electrode unit 5. As a result, the electrode terminal of the harness Hm and the electrode terminal of the cable of the negative electrode unit 5 are electrically in contact with each other, and a voltage supplied from the electrical equipment system via the harness Hm is applied to the electrode needles Nm of the negative electrode unit 5.

Figure 7B:
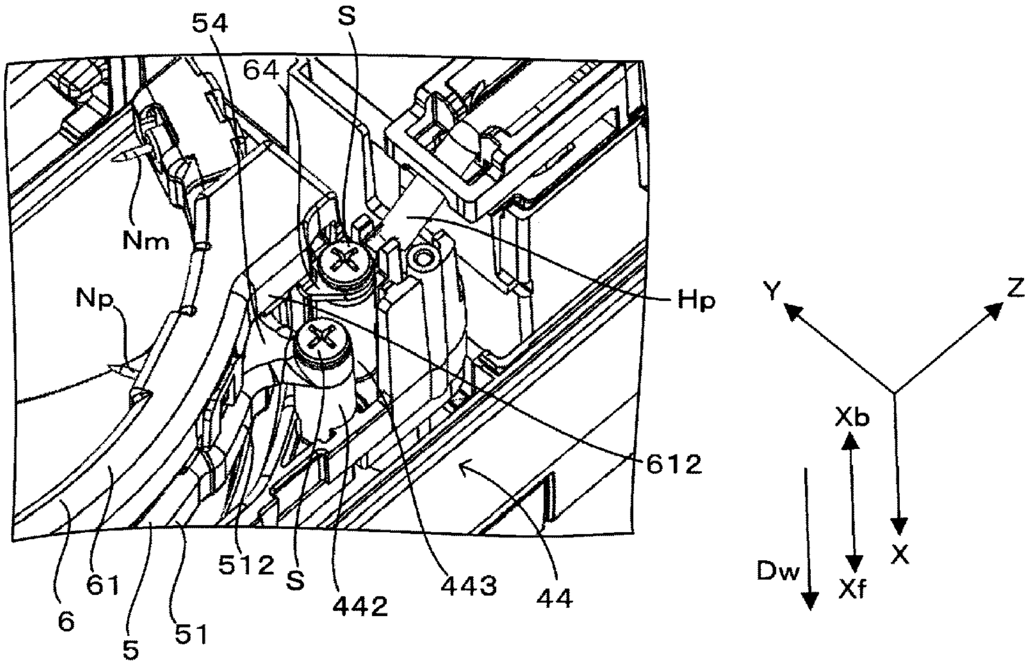
FIG. 7B is a perspective view illustrating a configuration in which a voltage is applied to the positive electrode unit.

FIG. 7B is a perspective view illustrating a configuration in which a voltage is applied to the positive electrode unit. The static eliminator 1 has a harness Hp, which extends from the electrical equipment system accommodated in the electrical equipment accommodating portion 202 to the fixing portion 64 of the positive electrode unit 6, and an electrode terminal is exposed at a tip of the harness Hp. Further, an electrode terminal of the cable electrically connected to the electrode needles Np is exposed on a side surface on the front side Xf of the fixing portion 64. Then, the fixing portion 64 is fastened to the fastening portion 443 in a state in which the electrode terminal of the harness Hp is sandwiched between the fastening portion 443 and the electrode terminal of the fixing portion 64 of the positive electrode unit 6. As a result, the electrode terminal of the harness Hp and the electrode terminal of the cable of the positive electrode unit 6 are electrically in contact with each other, and a voltage supplied from the electrical equipment system via the harness Hp is applied to the electrode needles Np of the positive electrode unit 6.

Figure 8A:
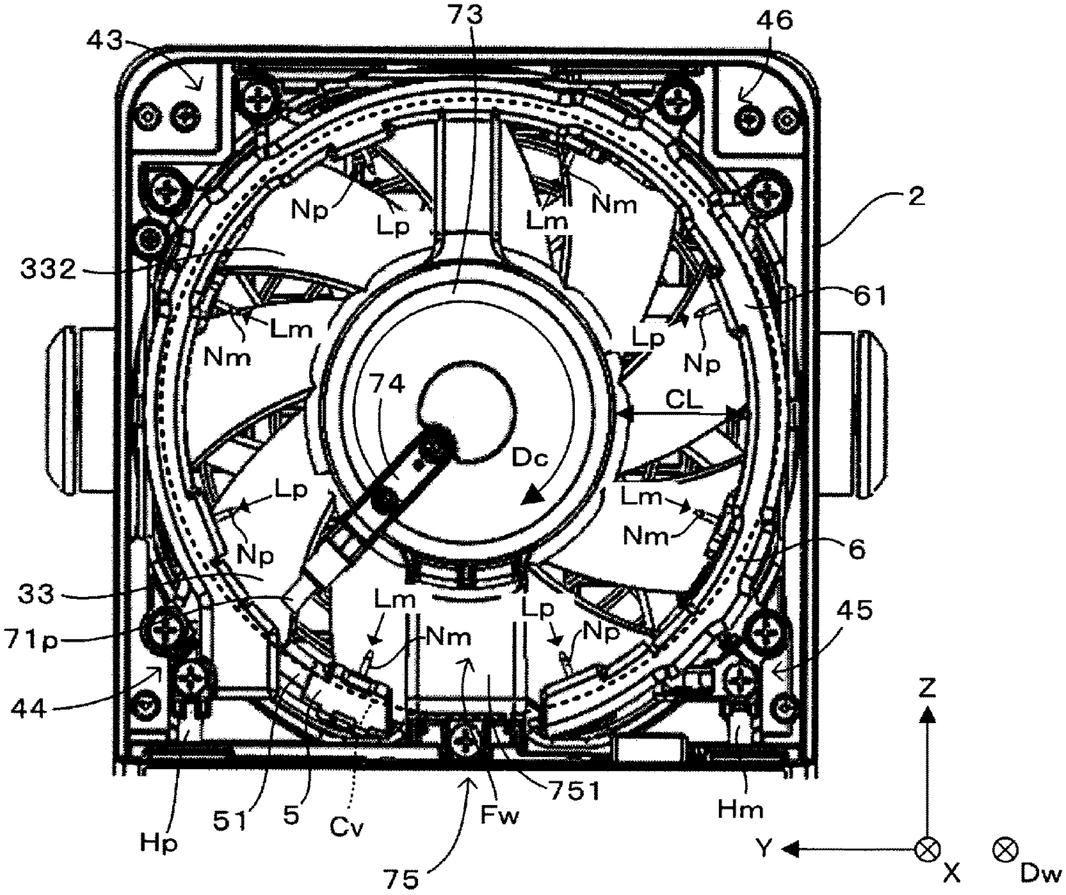
FIG. 8A is a rear view illustrating a configuration of a cleaning unit.
Figure 8B:
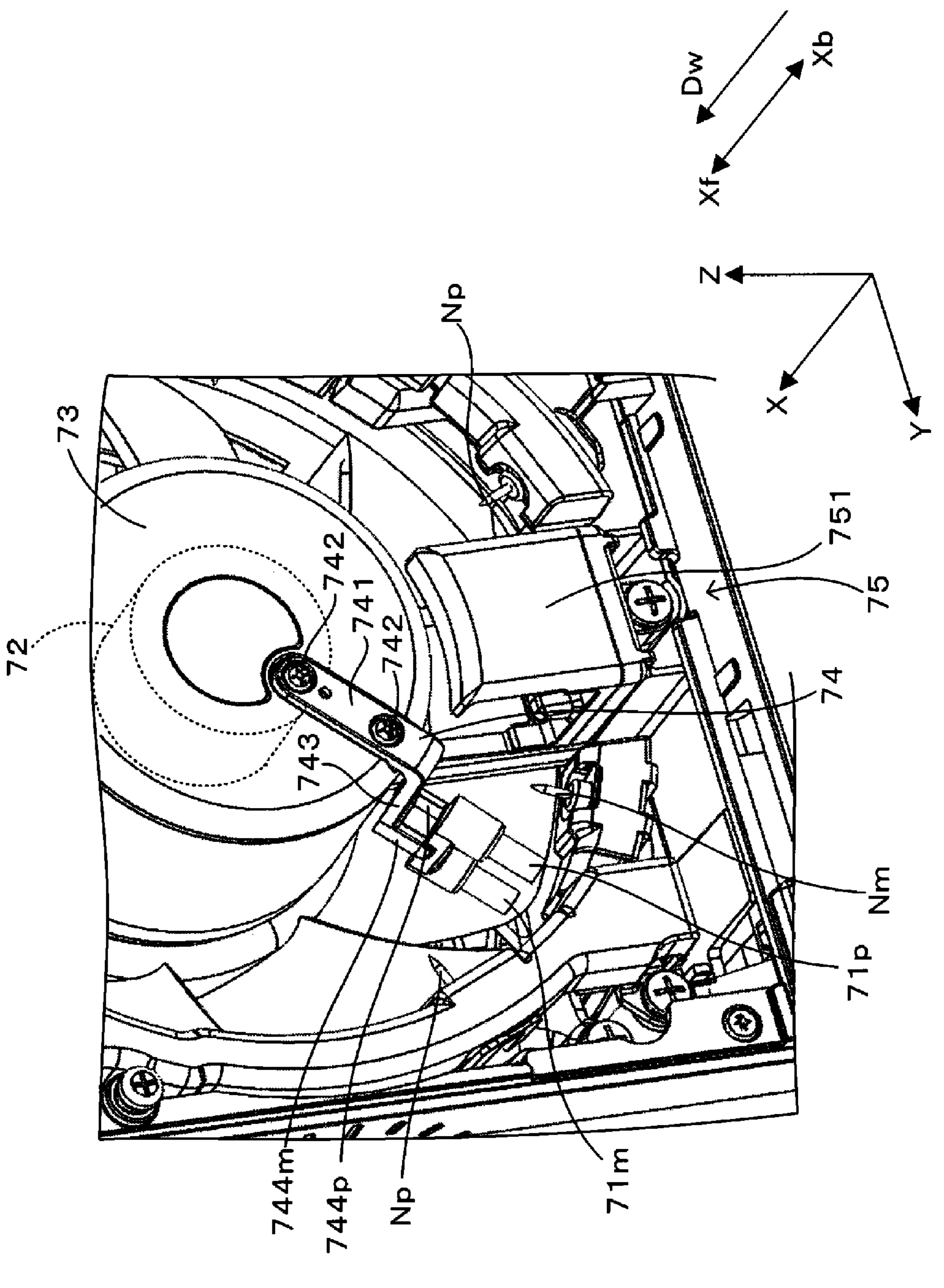
FIG. 8B is a perspective view illustrating the configuration of the cleaning unit.

FIG. 8A is a rear view illustrating a configuration of the cleaning unit, and FIG. 8B is a perspective view illustrating the configuration of the cleaning unit. The cleaning unit 7 includes cleaning brushes 71*m* and 71*p*, a motor 72, a rotating plate 73 driven by the motor 72, and a brush supporter 74 that supports the cleaning brushes 71*m* and 71*p* with respect to the rotating plate 73.

The motor 72 is accommodated in a cylindrical part of the fixing base 4 centered on an axis parallel to the X direction. The rotating plate 73 has a disk shape centered on the axis. Further, the motor 72 and the rotating plate 73 are arranged at the center of the virtual circle Cv as viewed from the X direction, and a clearance CL is provided between each of the inner walls 511 and 611 of the first and second unit frames 51 and 61 and each of outer circumferences of the motor 72 and the rotating plate 73. This clearance CL opposes the plurality of blades 332 of the fan 33, and the air generated by the fan 33 passes through the clearance CL in the flow path Fw. The motor 72 has a rotating shaft passing through the center point Pc and parallel to the X direction, and the rotating plate 73 is provided coaxially with the motor 72. The rotating plate 73 is driven by the motor 72 to rotate in the circumferential direction Dc about the rotating shaft of the motor 72. In this example, the motor 72 is a stepping motor. However, a type of the motor 72 is not limited to this example.

The brush supporter 74 includes an attachment portion 741 attached to a back surface of the rotating plate 73, and a screw 742 for fastening the attachment portion 741 to the back surface of the rotating plate 73. A tip of the attachment portion 741 protrudes to the outer side of the rotating plate 73, and the brush supporter 74 includes an extending portion 743 extending from a tip of the rotating plate 73 to the front side Xf in the X direction, and two support portions 744*m* and 744*p* protruding from the extending portion 743 to the outer side in the radial direction around the center point Pc. Each of the support portions 744*m* and 744*p* extends from the extending portion 743 to the outer side of the rotating plate 73 in the radial direction. The support portions 744*m* and 744*p* are arrayed in the X direction, and the support portion 744*p* is located on the rear side Xb of the support portion 744*m*. Furthermore, the brush supporter 74 includes the brush holders 745*m*, 745*p* attached tips of the support portions 744*m* and 744*p*, respectively. The brush holders 745*m* and 745*p* are arrayed in the X direction, and the brush holder 745*p* is located on the rear side Xb of the brush holder 745*m*.

The cleaning brush 71*m* is held by the brush holder 745*m*, and the cleaning brush 71*p* is held by the brush holder 745*p*. The cleaning brush 71*m* and the cleaning brush 71*p* are provided to correspond to the electrode needles Nm and the electrode needles Np, respectively, and extend in the radial direction around the center point Pc. The cleaning brush 71*m* and the cleaning brush 71*p* are arrayed in the X direction, and the cleaning brush 71*p* is located on the rear side Xb of the cleaning brush 71*m*. The cleaning brush 71*m* opposes the inner wall 511 of the first unit frame 51, and the cleaning brush 71*p* opposes the inner wall 611 of the second unit frame 61. In such a configuration, the cleaning brushes 71*m* and 71*p* move in the circumferential direction Dc by a driving force of the motor 72. Then, the cleaning unit 7 cleans the electrode needles Nm and Np as follows by driving the cleaning brushes 71*m* and 71*p* by the motor 72.

That is, a plurality of cleaning positions Lm arrayed in the circumferential direction Dc are provided, and the plurality of cleaning positions Lm correspond to the plurality of electrode needles Nm, respectively. Then, the cleaning brush 71*m* is located at one cleaning position Lm corresponding to one electrode needle Nm to be cleaned among the plurality of electrode needles Nm, thereby coming into contact with the one electrode needle Nm. In particular, the motor 72 causes the cleaning brush 71*m* in contact with one electrode needle Nm at one cleaning position Lm to slightly reciprocate in the circumferential direction Dc, whereby dirt adhering to the one electrode needle Nm can be scraped off by a tip of the cleaning brush 71*m*.

Similarly, a plurality of cleaning positions Lp arrayed in the circumferential direction Dc are provided, and the plurality of cleaning positions Lp correspond to the plurality of electrode needles Np, respectively. Then, the cleaning brush 71*p* is located at one cleaning position Lp corresponding to one electrode needle Np to be cleaned among the plurality of electrode needles Np, thereby coming into contact with the one electrode needle Np. In particular, the motor 72 causes the cleaning brush 71*p* in contact with one electrode needle Np at one cleaning position Lp to slightly reciprocate in the circumferential direction Dc, whereby dirt adhering to the one electrode needle Np can be scraped off by a tip of the cleaning brush 71*p*.

Further, the cleaning unit 7 also includes a brush cleaner 75 that cleans the cleaning brushes 71*m* and 71*p*. The brush cleaner 75 includes an accommodation box 751 that accommodates the cleaning brushes 71*m* and 71*p*. The accommodation box 751 is open in the circumferential direction Dc (in other words, the Y direction), and the cleaning brushes 71*m* and 71*p* can be put into the accommodation box 751 or taken out from the accommodation box 751 by moving the cleaning brushes 71*m* and 71*p* in the circumferential direction Dc by the motor 72. FIGS. 8A and 8B illustrate a state in which the cleaning brushes 71*m* and 71*p* are taken out of the accommodation box 751, and FIG. 4 illustrates a state in which the cleaning brushes 71*m* and 71*p* are put into the accommodation box 751.

The brush cleaner 75 removes dirt from the cleaning brushes 71*m* and 71*p* by sliding contact members provided in the accommodation box 751. That is, in the accommodation box 751, the sliding contact members are provided, respectively, to correspond to openings on both sides in the circumferential direction Dc of the accommodation box 751. Then, the tips of the cleaning brushes 71*m* and 71*p* moving in the circumferential direction Dc by the driving force of the motor 72 are slid on the sliding contact members of the brush cleaner 75. As a result, the dirt adhering to the cleaning brushes 71*m* and 71*p* is scraped off against by the sliding contact members of the brush cleaner 75, whereby cleaning of the cleaning brushes 71*m* and 71*p* is executed. This cleaning is executed when the cleaning brushes 71*m* and 71*p* enter the accommodation box 751 and exit the accommodation box 751.

The cleaning unit 7 is supported by the I-shaped part of the fixing base 4 described above. Specifically, the motor 72 is supported by the fixing base 4 at the center of the I-shaped part. Further, the brush cleaner 75 is attached to a part having a flat plate-shape in a bottom portion of the fixing base 4.

Next, a mechanism for supporting the housing 2 with respect to a placement surface on which the static eliminator 1 is placed will be described. FIG. 9 is a lower perspective view illustrating a bottom surface of the static eliminator of FIG. 1. The static eliminator 1 includes insulating pads 131, 132, 133, and 134 provided at four corners of a bottom surface 2B of the housing 2. Among them, the insulating pad 131 and the insulating pad 132 are arranged on the bottom surface of a cover plate 23 of the front frame 21 with a clearance in the Y direction. Further, the insulating pad 133 and the insulating pad 134 are arranged on a bottom surface of an attachment frame 27 of the rear frame 25 with a clearance in the Y direction. The insulating pads 131, 132, 133, and 134 protrude downward from the bottom surface 2B of the housing 2. Therefore, the insulating pads 131, 132, 133, and 134 are in contact with the placement surface between the bottom surface 2B of the housing 2 and the placement surface in a state in which the housing 2 is placed on the placement surface, thereby separating the front frame 21 and the rear frame 25 from the placement surface.

Figure 10:
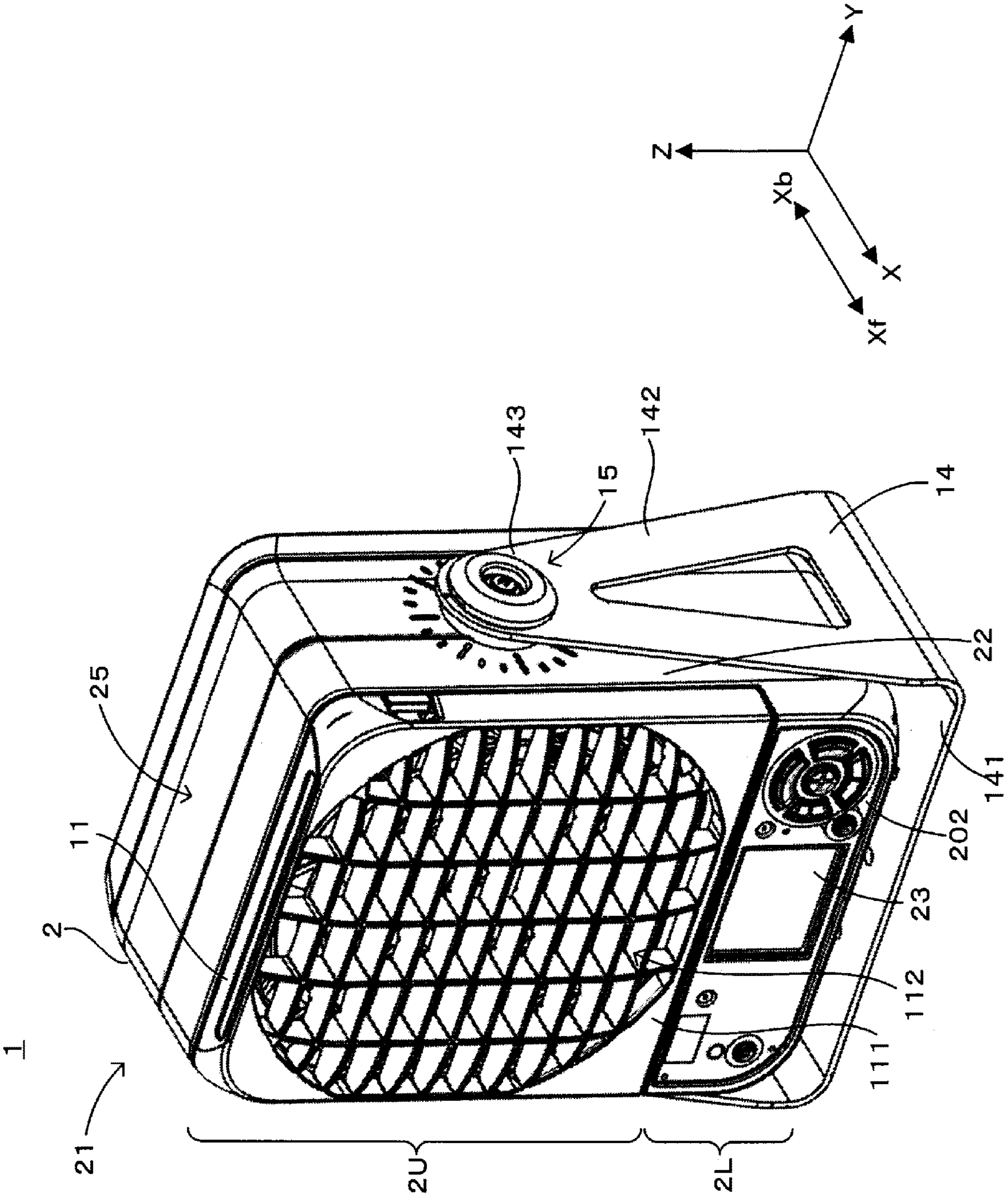
FIG. 10 is a front perspective view illustrating the static eliminator in which a support fitting is attached to a housing.
Figure 11:
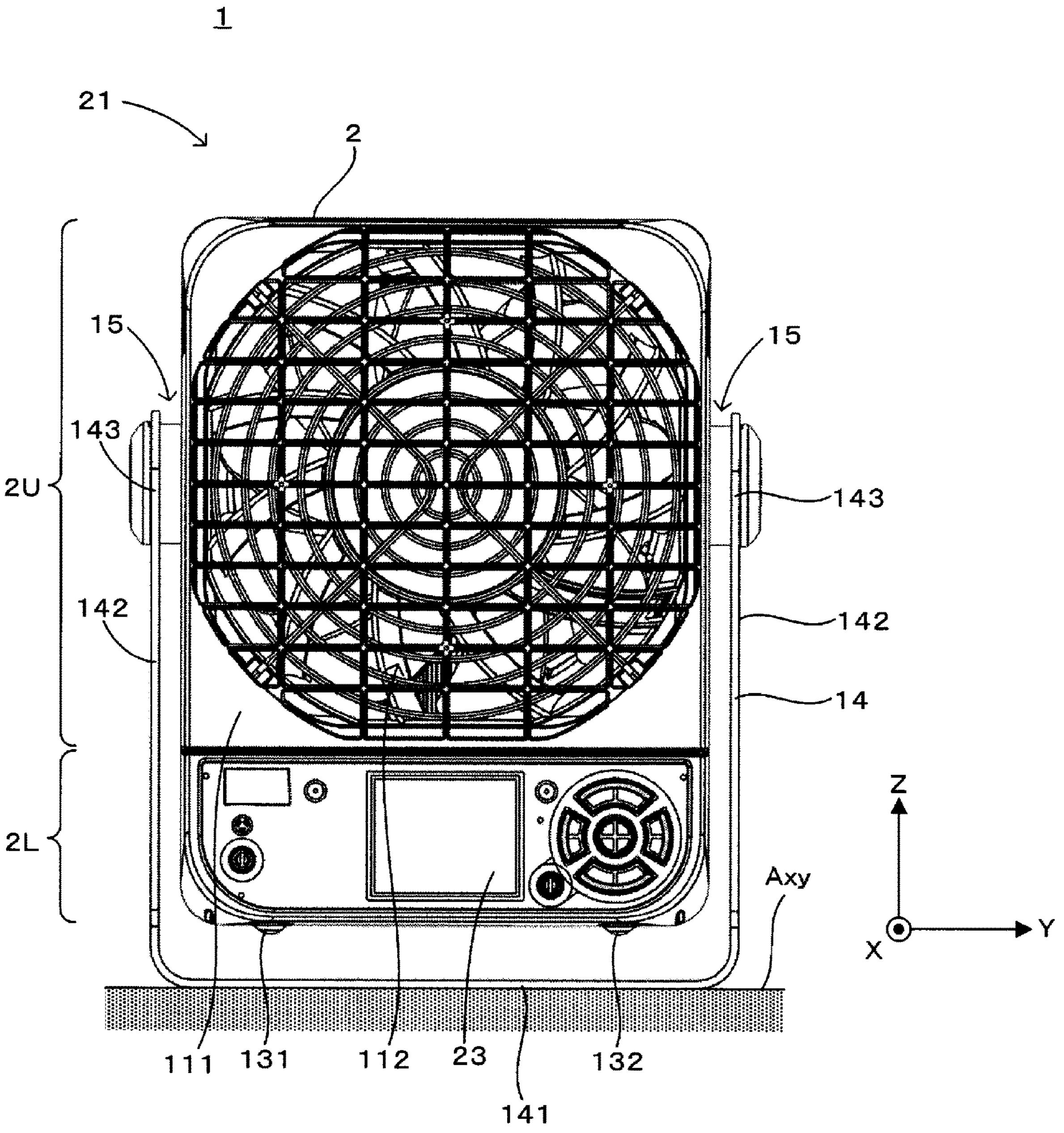
FIG. 11 is a front view illustrating the static eliminator in which the support fitting is attached to the housing.
Figure 12:
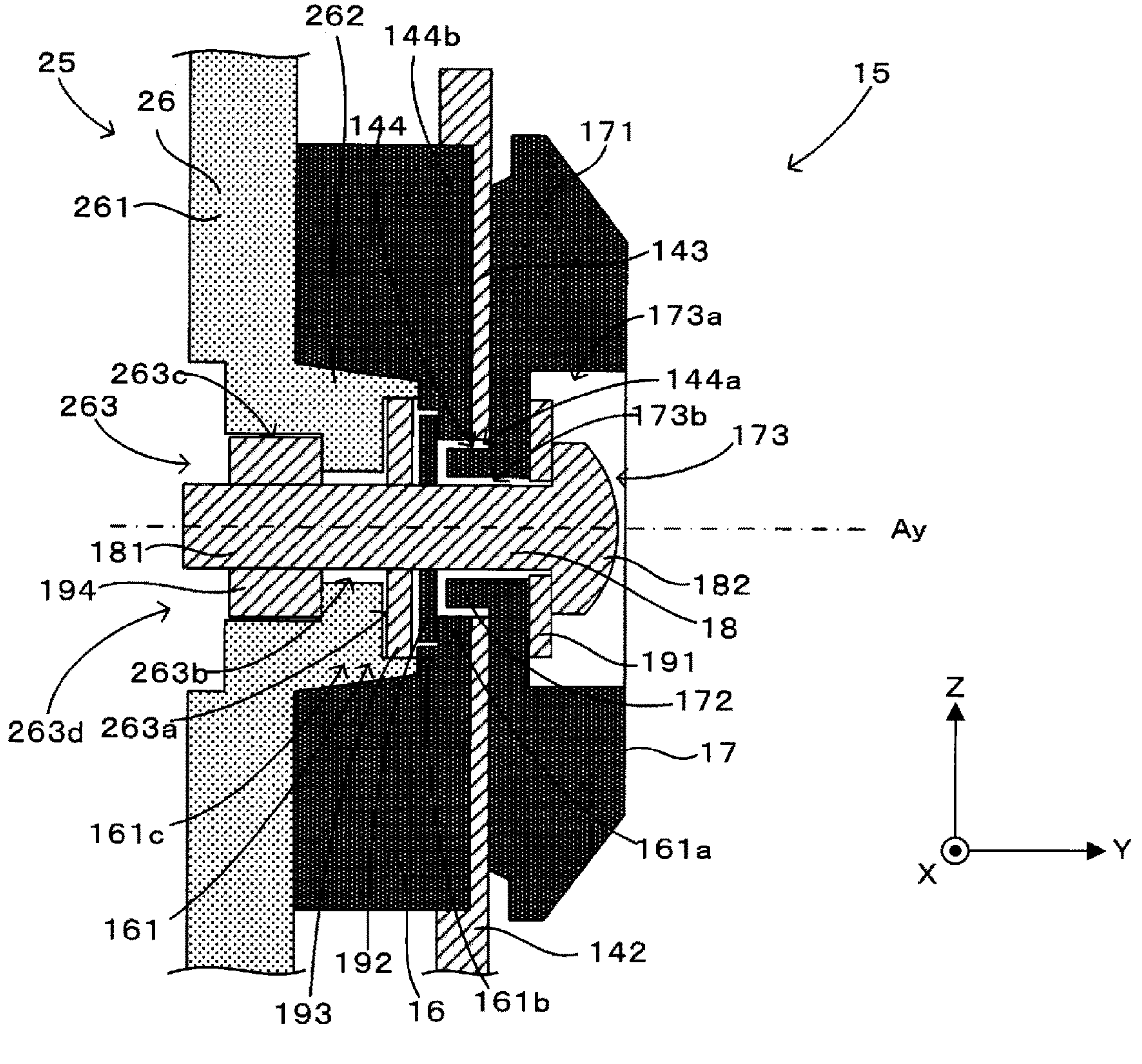
FIG. 12 is a cross-sectional view schematically illustrating a configuration of a fitting attachment portion for attaching the support fitting to the housing.

Further, in addition to the insulating pads 131, 132, 133, and 132, the static eliminator 1 includes a support fitting that supports the housing 2 with respect to the placement surface (FIGS. 10, 11, and 12). FIG. 10 is a front perspective view illustrating the static eliminator in which the support fitting is attached to the housing; FIG. 11 is a front view illustrating the static eliminator in which the support fitting is attached to the housing; and FIG. 12 is a cross-sectional view schematically illustrating a configuration of a fitting attachment portion for attaching the support fitting to the housing. Note that FIG. 11 illustrates a placement surface Axy which is a horizontal plane, and FIG. 12 illustrates an axis Ay which is a virtual straight line parallel to the Y direction.

The static eliminator 1 illustrated in FIGS. 10 and 11 includes a support fitting 14 that is made of metal and is electrically conductive, and two fitting attachment portions 15 for detachably attaching the support fitting 14 to the housing 2. The support fitting 14 includes a placement plate 141 extending parallel to the Y direction and mounted on the placement surface Axy, and two upright plates 142 extending upward from both ends of the placement plate 141 in the Y direction. In the Y direction, the housing 2 is located between the two upright plates 142, and each of the upright plates 142 opposes a side surface of the housing 2 in the Y direction with a clearance therebetween.

The two fitting attachment portions 15 are provided to correspond to the two upright plates 142, respectively, and each of the fitting attachment portions 15 attaches the corresponding upright plate 142 to the side surface of the housing 2 in the Y direction. That is, an upper end portion

143 of the upright plate 142 opposes the rear frame 25 in the Y direction, and is attached to the rear frame 25 by the fitting attachment portion 15. As described above, the rear frame 25 is a part of the rear frame 25 made of an antistatic resin, and is electrically conductive.

Further, details of a configuration in which the upright plate 142 is attached to the rear frame 25 by the fitting attachment portion 15 are as illustrated in FIG. 12. Note that, in FIG. 12, a member (the rear frame 25) with a light dot pattern is an antistatic resin, members (an inner spacer 16, an outer spacer 17, and a resin sheet 192) with a dark dot pattern are insulators, and members (a screw 18, washers 191 and 193, and a nut 194) with oblique hatching are metal.

Aside surface of the rear frame 25 includes a flat plate portion 261 parallel to the Z direction and orthogonal to the Y direction, and a protruding portion 262 protruding outward from the flat plate portion 261 in the Y direction. An outer shape of the protruding portion 262 is a truncated cone centered on the axis Ay having a diameter decreasing outward. Further, the rear frame 25 is provided with a through hole 263 penetrating through the flat plate portion 261 and the protruding portion 262 in the Y direction. The through holes 263 includes spaces 263*a*, 263*b*, 263*c*, and 263*d* each of which has the axis Ay as the center. The spaces 263*a*, 263*b*, 263*c*, and 263*d* are aligned in the Y direction in this order from the outer side to the inner side of the housing 2. That is, in the Y direction, the space 263*b* is provided on the inner side of the space 263*a*, the space 263*c* is provided on the inner side of the space 263*b*, and the space 263*d* is provided on the inner side of the space 263*c*. Further, a diameter of the space 263*b* is smaller than a diameter of the space 263*a*, a diameter of the space 263*c* is larger than the diameter of the space 263*b*, and a diameter of the space 263*d* is larger than the diameter of the space 263*c*.

The upper end portion 143 of the upright plate 142 opposes the protruding portion 262 from the outer side in the Y direction. The upper end portion 143 is provided with a through hole 144 penetrating therethrough in the Y direction. The through hole 144 includes spaces 144*a* and 144*b* each of which has the axis Ay as the center. The spaces 144*a* and 144*b* are aligned in the Y direction in this order from the outer side to the inner side of the housing 2. That is, the space 144*b* is provided on the inner side of the space 144*a* in the Y direction. Further, a diameter of the space 144*b* is larger than a diameter of the space 144*a*.

On the other hand, the fitting attachment portion 15 has an inner spacer 16 that has an insulating property and is arranged between the upper end portion 143 of the upright plate 142 and the rear frame 25 in the Y direction. An outer shape of the inner spacer 16 is a cylindrical shape having the same diameter as the space 144*b* of the through hole 144. Further, the inner spacer 16 has a through hole 161 penetrating therethrough in the Y direction. The through hole 161 includes spaces 161*a*, 161*b*, and 161*c* each of which has the axis Ay as the center. The spaces 161*a*, 161*b*, and 161*c* are aligned in the Y direction in this order from the outer side to the inner side of the housing 2. That is, in the Y direction, the space 161*b* is provided on the inner side of the space 161*a*, and the space 161*c* is provided on the inner side of the space 161*b*. Further, a diameter of the space 161*b* is larger than a diameter of the space 161*a*, and diameters of both end surfaces of the space 161*c* are larger than the diameter of the space 161*b*. Note that the diameter of the space 161*c* decreases outward.

The protruding portion 262 of the rear frame 25 is fitted into the space 161*c* of the through hole 161 of the inner spacer 16. Furthermore, the inner spacer 16 is fitted into the space 144*b* of the through hole 144 of the upright plate 142. As a result, the rear frame 25, the inner spacer 16, and the upright plate 142 are positioned to each other, and the through hole 263 of the rear frame 25, the through hole 161 of the inner spacer 16, and the through hole 144 of the upright plate 142 oppose each other in the Y direction.

Furthermore, the fitting attachment portion 15 further includes an outer spacer 17 that has an insulating property and is provided on the outer side of the upright plate 142 in the Y direction. The outer spacer 17 includes a spacer body 171 and a protruding portion 172 protruding inward from the spacer body 171 in the Y direction. An outer shape of the protruding portion 172 is a cylindrical shape centered on the axis Ay. Further, the outer spacer 17 is provided with a through hole 173 penetrating through the spacer body 171 and the protruding portion 172 in the Y direction. The through hole 173 includes spaces 173*a* and 173*b* each of which has the axis Ay as the center. The spaces 173*a* and 173*b* are aligned in the Y direction in this order from the outer side to the inner side of the housing 2. That is, the space 173*b* is provided on the inner side of the space 173*a* in the Y direction. Further, a diameter of the space 173*b* is smaller than a diameter of the space 173*a*.

The protruding portion 172 of the outer spacer 17 is fitted into the space 144*a* of the through hole 144 of the upright plate 142 and the space 161*a* of the through hole 161 of the inner spacer 16. As a result, the outer spacer 17 is positioned with respect to the upright plate 142 and the inner spacer 16, and the through hole 161 of the inner spacer 16 and the through hole 173 of the outer spacer 17 oppose each other in the Y direction. Note that the protruding portion 172 is loosely fitted to the through hole 144 and the through hole 161.

In this manner, the through hole 263 of the rear frame 25, the through hole 161 of the inner spacer 16, the through hole 144 of the upright plate 142, and the through hole 173 of the outer spacer 17 are aligned in the Y direction about the axis Ay as the center. On the other hand, the fitting attachment portion 15 has the screw 18 that is made of metal and is inserted into the through holes 263 and 161 and the through holes 144 and 173 from the outer side. The screw 18 includes a shaft portion 181 provided with a screw groove and a head portion 182 provided at one end of the shaft portion 181. The shaft portion 181 is inserted into the through holes 263, 161, 144, and 173 in a state in which the shaft portion 181 is parallel to the Y direction and the head portion 182 faces outward. On the other hand, the fitting attachment portion 15 has the three washers 191, 192, and 193 and the nut 194 each of which is made of metal. The washer 191 is arranged in the space 173*a* of the through hole 173 of the outer spacer 17, the washer 192 is arranged in the space 161*b* of the through hole 161 of the inner spacer 16, the washer 193 is arranged in the space 263*a* of the through hole 263 of the rear frame 25, and the nut 194 is arranged in the space 263*c* of the through hole 263 of the rear frame 25. Then, the shaft portion 181 of the screw 18 is inserted into the washers 191 and 193 from the outer side in parallel with the Y direction, and is screwed into the nut 194.

That is, the shaft portion 181 of the screw 18 is screwed into the nut 194 in a state in which the head portion 182 of the screw 18 abuts against the outer spacer 17 (specifically, a bottom surface of the space 173*a* of the through hole 173) from the outer side across the washer 191 and the nut 194 screwed into the shaft portion 181 of the screw 18 abuts against the rear frame 25 (specifically, a bottom surface of the space 263*c* of the through hole 263) from the inner side. Accordingly, the rear frame 25, the inner spacer 16, the upright plate 142, and the outer spacer 17 are fastened to each other. At this time, the inner spacer 16 is arranged between the rear frame 25 and the upright plate 142, and is in contact with each of the rear frame 25 and the upright plate 142. Further, the spacer body 171 of the outer spacer 17 is arranged between the upright plate 142 and the head portion 182 of the screw 18, is in contact with the upright plate 142, and abuts on the head portion 182 of the screw 18 across the washer 191. Furthermore, the protruding portion 172 of the outer spacer 17 is located between a peripheral edge of the through hole 144 of the upright plate 142 and the shaft portion 181 of the screw 18.

Thus, the support fitting 14 is attached to the housing 2 by the fitting attachment portion 15 so as to be rotatable about the axis Ay. Therefore, a direction in which ions are released from the static eliminator 1 can be changed by rotating the housing 2 with respect to the support fitting 14. Further, the insulating pads 131, 132, 133, and 134 are separated from the placement surface Axy in a state in which the support fitting 14 supports the housing 2 with respect to the placement surface Axy.

Figure 13:
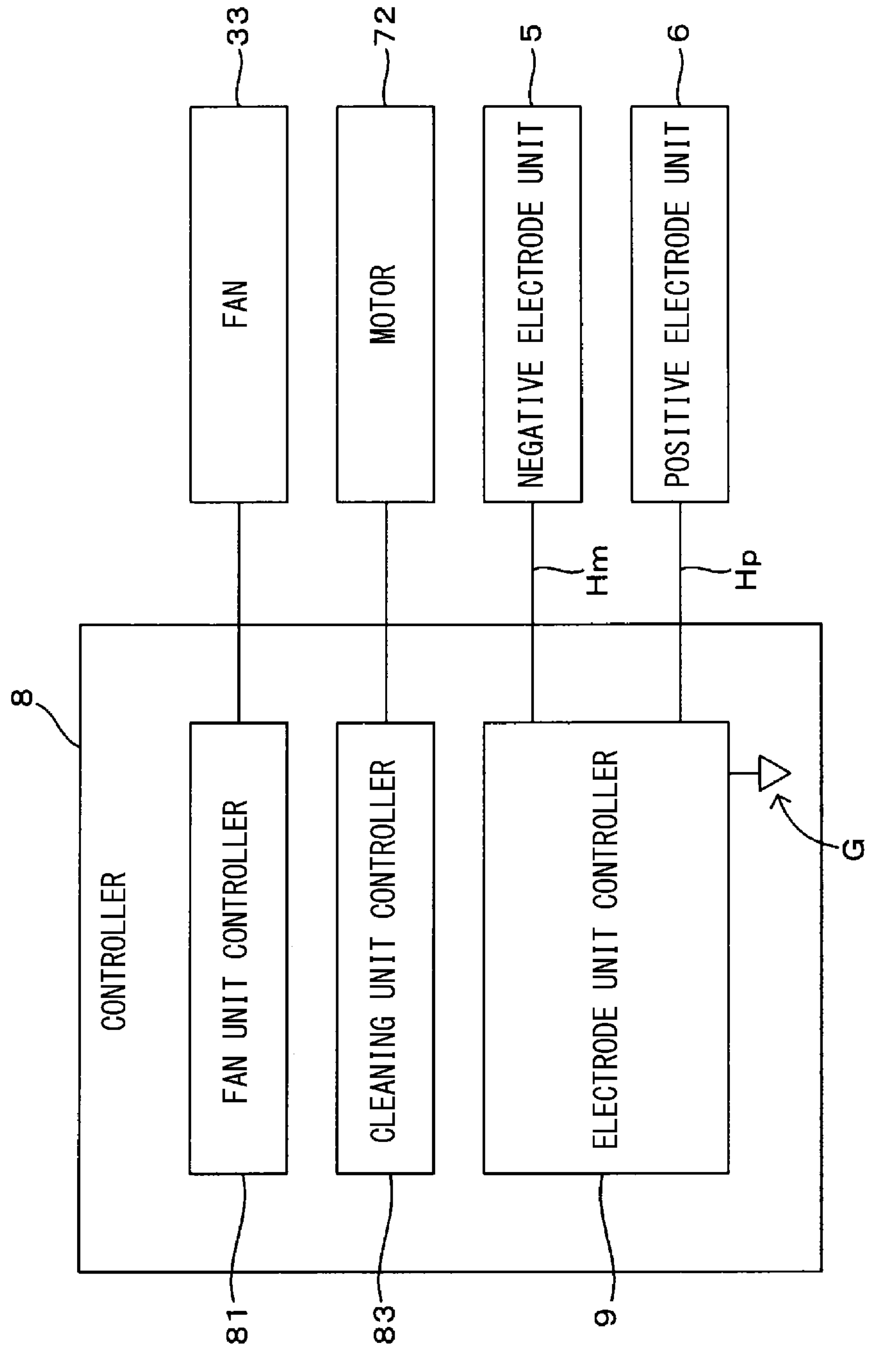
FIG. 13 is a block diagram schematically illustrating a configuration of a controller which is an electrical equipment system of the static eliminator of FIG. 1.

FIG. 13 is a block diagram schematically illustrating a configuration of a controller which is the electrical equipment system of the static eliminator of FIG. 1. The static eliminator 1 includes a controller 8 accommodated in the electrical equipment accommodating portion 202. The controller 8 includes a fan unit controller 81 that controls the fan unit 3, a cleaning unit controller 83 that controls the cleaning unit 7, and an electrode unit controller 9 that controls the negative electrode unit 5 and the positive electrode unit 6.

The fan unit controller 81 rotates the fan 33 provided in the fan unit 3 to generate air flowing in the air blowing direction Dw in the fan 33. This air flows into the housing 2 from the rear side Xb via the rear wire mesh 125. Furthermore, after passing through the flow path Fw in the housing 2, the air flows out from the housing 2 to the front side Xf via the front wire mesh 115 and the mesh portion 112. The air flowing out from the housing 2 in this manner reaches the object to be neutralized.

The cleaning unit controller 83 causes the cleaning brushes 71*m* and 71*p* to clean the electrode needles Nm and Np by controlling a rotational position of the motor 72 of the cleaning unit 7. That is, when cleaning one electrode needle Nm among the plurality of electrode needles Nm, the cleaning unit controller 83 controls the rotational position of the motor 72 to move the cleaning brush 71*m* to the cleaning position Lm opposing the one electrode needle Nm, and then, cause the cleaning brush 71*m* to slightly reciprocate in the circumferential direction Dc (a cleaning operation). Further, all of the plurality of electrode needles Nm can be cleaned by executing the cleaning operation while sequentially changing one electrode needle Nm to be cleaned among the plurality of electrode needles Nm. Similarly, when cleaning one electrode needle Np among the plurality of electrode needles Np, the cleaning unit controller 83 controls the rotational position of the motor 72 to move the cleaning brush 71*p* to the cleaning position Lp opposing the one electrode needle Np, and then, cause the cleaning brush 71*p* to slightly reciprocate in the circumferential direction Dc (a cleaning operation). Further, all of the plurality of electrode needles Np can be cleaned by executing the cleaning operation while sequentially changing one electrode needle Np to be cleaned among the plurality of electrode needles Np.

As described above, the electrode unit controller 9 is connected to the negative electrode unit 5 by the harness Hm, and is connected to the positive electrode unit 6 by the harness Hp. The electrode unit controller 9 controls the voltage applied to the electrode needle Nm of the negative electrode unit 5 via the harness Hm and the voltage applied to the electrode needle Np of the positive electrode unit 6 via the harness Hp, thereby generating a corona discharge between the tip portion of the electrode needle Nm and the tip portion of the electrode needle Np. Due to this corona discharge, negative ions are generated around the tip portion of the electrode needle Nm, and positive ions are generated around the tip portion of the electrode needle Np. Furthermore, the rear wire mesh 125, the positive electrode unit 6, and the negative electrode unit 5 are arrayed in order in the air blowing direction Dw, and the rear wire mesh 125 is connected to the ground G. Therefore, a corona discharge is generated between the electrode needle Np and the rear wire mesh 125, and positive ions are generated around the electrode needle Np. Similarly, a corona discharge is generated between the electrode needle Nm and the rear wire mesh 125, and negative ions are generated around the electrode needle Nm.

As described above, the electrode needle Nm and the electrode needle Np protrude to the flow path Fw, and the air generated by the fan 33 passes the tip portions of the electrode needle Nm and the electrode needle Np. Therefore, the negative ions generated around the tip portion of the electrode needle Nm and the positive ions generated around the tip portion of the electrode needle Np advance to the front side Xf with the air passing through the flow path Fw in the air blowing direction Dw. Further, the fan 33 that generates the air is located on the front side Xf of the positive electrode unit 6 and the negative electrode unit 5, in other words, on the downstream side in the air blowing direction Dw. Therefore, the negative ions and the positive ions flow out from the housing 2 to the front side Xf via the front wire mesh 115 and the mesh portion 112 after being stirred by the fan 33.

Figure 14:
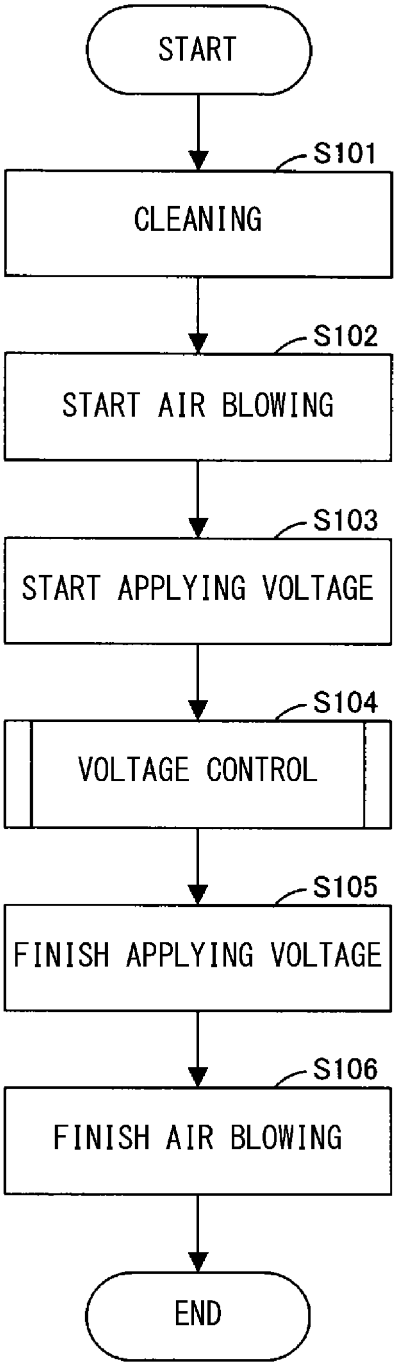
FIG. 14 is a flowchart illustrating an example of an operation executed by the controller of FIG. 13.

FIG. 14 is a flowchart illustrating an example of an operation executed by the controller of FIG. 13. In Step S101, the cleaning unit controller 83 starts cleaning the electrode needles Nm and the electrode needles Np. As illustrated in FIG. 8A, in the static eliminator 1, the electrode needles Nm and Np are alternately aligned clockwise in the circumferential direction Dc, and a total of eight electrode needles Nm and Np are aligned. On the other hand, the cleaning operations for the eight electrode needles Nm and Np are performed in order of proximity to the accommodation box 751 in the clockwise direction. More specifically, for each of the electrode needles Nm and Np, the cleaning brushes 71*m* and 71*p* are moved back and forth so as to pass the electrode needles Nm and Np, and then, the cleaning brushes 71*m* and 71*p* are moved so as to clean the next electrode needles Nm and Np. In the present embodiment, the cleaning brushes 71*m* and 71*p* are moved such that the cleaning operation is executed for each of the electrode needles Nm and Np, but a moving method is not limited thereto. For example, it may be configured such that all the electrode needles Nm and Np are cleaned by moving the cleaning brushes 71*m* and 71*p* in one direction. Further, the cleaning operations for the electrode needles Nm and Np may be executed in order of proximity to the accommodation box 751 in the counterclockwise direction.

That is, the cleaning unit controller 83 controls the rotational position of the motor 72 to move the cleaning brushes 71*m* and 71*p* from the brush cleaner 75 to the cleaning position Lm opposing the first electrode needle Nm, thereby executing the cleaning operation on this electrode needle Nm. At this time, the cleaning brushes 71*m* and

71*p* moving from the accommodation box 751 to the cleaning position Lm are slid on the sliding contact members of the brush cleaner 75, whereby the cleaning of the cleaning brushes 71*m* and 71*p* is executed. Further, when the cleaning operation for the last (eighth) electrode needle Np is completed, the cleaning unit controller 83 controls the rotational position of the motor 72 to move the cleaning brushes 71*m* and 71*p* from the cleaning position Lp opposing the last electrode needle Np to the accommodation box 751. At this time, the cleaning brushes 71*m* and 71*p* moving from the cleaning position Lp to the accommodation box 751 are slid on the sliding contact members of the brush cleaner 75, whereby the cleaning of the cleaning brushes 71*m* and 71*p* is executed. Incidentally, the cleaning unit controller 83 make speeds of the cleaning brushes 71*m* and 71*p* at the time of taking out the cleaning brushes 71*m* and 71*p* from the accommodation box 751 slower than speeds of the cleaning brushes 71*m* and 71*p* at the time of putting the cleaning brushes 71*m* and 71*p* into the accommodation box 751.

In Step S102, the fan unit controller 81 starts rotation of the fan 33 to generate air in the air blowing direction Dw. In Step S103, the electrode unit controller 9 starts applying a voltage to the electrode needles Nm of the negative electrode unit 5 and applying a voltage to the electrode needles Np of the positive electrode unit 6. As a result, a negative DC voltage Vm lower than a voltage of the ground G is applied to the electrode needles Nm, and a positive DC voltage Vp higher than the voltage of the ground G is applied to the electrode needles Np. Further, the rear wire mesh 125 is connected to the ground G. Therefore, a potential difference Vm is generated between the electrode needle Nm and the rear wire mesh 125, a potential difference Vp is generated between the electrode needle Nm and the rear wire mesh 125, and a potential difference Vpm (=Vp−Vm) is generated between the electrode needle Np and the electrode needle Nm. Then, negative ions and positive ions are generated by corona discharges respectively generated by the potential difference Vm, the potential difference Vp, and the potential difference Vpm. The negative ions and the positive ions thus generated advance in the air blowing direction Dw by the air and are released from the static eliminator 1 to the front side Xf (a static elimination operation). Note that the cleaning unit controller 83 controls the rotational position of the motor 72 to locate the cleaning brushes 71*m* and 71*p* in the accommodation box 751 during execution of the static elimination operation.

In the voltage control in Step S104, feedback control for controlling ion balance in a long term and a short term is executed. Details of this voltage control will be described later with reference to FIGS. 15A and 15B. When the electrode unit controller 9 finishes applying the voltages to the electrode needles Nm and the electrode needles Np in Step S105 following Step S104, the fan unit controller 81 stops the fan 33 and finishes air blowing performed by the fan 33 in Step S106.

Figure 15A:
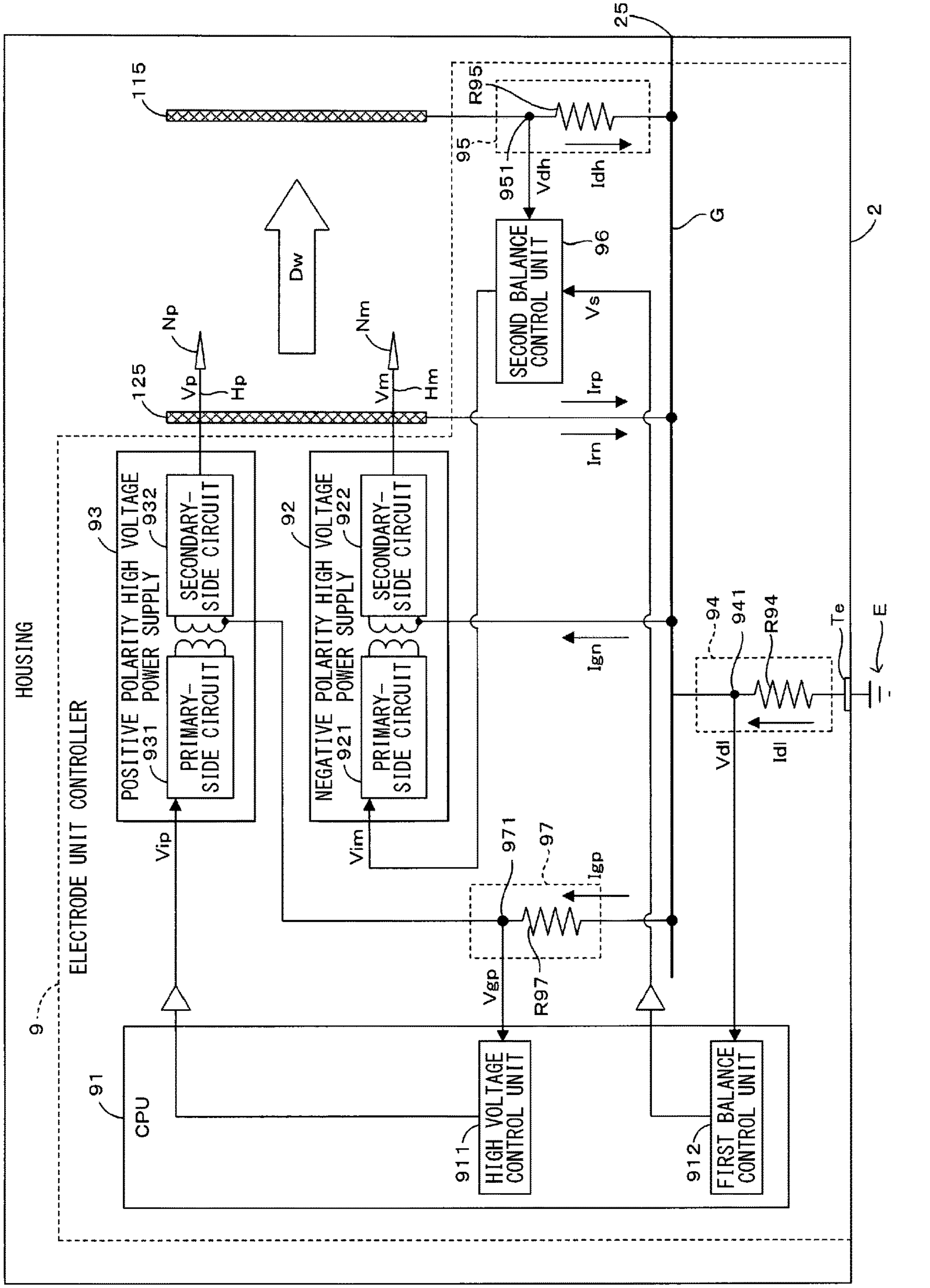
FIG. 15A is a block diagram illustrating details of an electrode unit controller.

FIG. 15A is a block diagram illustrating details of the electrode unit controller. The electrode unit controller 9 includes a central processing unit (CPU) 91, a negative polarity high voltage power supply 92 that generates the voltage Vm to be applied to the electrode needles Nm, and a positive polarity high voltage power supply 93 that generates the voltage Vp to be applied to the electrode needles Np. The CPU 91 executes digital signal processing for controlling the negative polarity high voltage power supply 92 and the positive polarity high voltage power supply 93. The CPU 91 includes a high voltage control unit 911 that controls the voltage Vp (high voltage) to be applied to the electrode needles Np, and a first balance control unit 912 that controls balance (ion balance) between negative ions and positive ions generated by the application of the voltages Vp and Vm to the electrode needles Np and Nm. Specifically, the CPU 91 executes a predetermined program to configure the high voltage control unit 911 and the first balance control unit 912.

The negative polarity high voltage power supply 92 is a transformer having a primary-side circuit 921 and a secondary-side circuit 922. A voltage signal Vim is input to the primary-side circuit 921, and the secondary-side circuit 922 is connected to each of the electrode needles Nm of the negative electrode unit 5 by the harness Hm. Then, the voltage Vm corresponding to the voltage signal Vim input to the primary-side circuit 921 is applied to each of the electrode needles Nm from the secondary-side circuit 922 via the harness Hm.

The positive polarity high voltage power supply 93 is a transformer having a primary-side circuit 931 and a secondary-side circuit 932. A voltage signal Vip is input to the primary-side circuit 931, and the secondary-side circuit 932 is connected to each of the electrode needles Np of the positive electrode unit 6 by the harness Hp. Then, the voltage Vp corresponding to the voltage signal Vip input to the primary-side circuit 931 is applied to each of the electrode needles Np from the secondary-side circuit 932 via the harness Hp.

In the housing 2, the above-described ground G (internal ground) is provided. The rear frame 25 made of the antistatic resin in the housing 2 is short-circuited to the ground G. Note that a mode of electrically connecting the rear frame 25 and the ground G is not limited to the short circuit, and these may be connected via a resistor.

Further, the electrode unit controller 9 includes: a ground electrode Te short-circuited to an earth E (external ground); and a low-response detection circuit 94 provided between the ground electrode Te and the ground G. The low-response detection circuit 94 includes a detection resistor R94 that connects the ground electrode Te and the ground G. The detection resistor R94 is provided to detect a current Idl flowing into the static eliminator 1 from the earth E via the ground electrode Te. That is, when there is a difference between the amount of the negative ions and the amount of the positive ions released from the static eliminator 1, an electric charge corresponding to the difference flows from the earth E into the ground electrode Te, and the current Idl due to the electric charge flows to the detection resistor R94. As a result, a voltage Vdl corresponding to the current Idl is generated at a detection point 941 between the detection resistor R94 and the ground G. In this manner, the low-response detection circuit 94 converts the current Idl, generated by the electric charge flowing into the housing 2 from the earth E via the ground electrode Te, into the voltage Vdl by the detection resistor R94. In other words, the low-response detection circuit 94 detects the voltage Vdl indicating ion balance between the negative ions and the positive ions generated by the static eliminator 1 and absorbed by the earth E.

Furthermore, the electrode unit controller 9 includes a high-response detection circuit 95 provided between the front wire mesh 115 and the ground G. The high-response detection circuit 95 includes a detection resistor R95 that connects the front wire mesh 115 and the ground G. The detection resistor R95 is provided to detect a current Idh flowing from the front wire mesh 115 to the ground G. That is, the negative ions and the positive ions generated around the electrode needle Nm and the electrode needle Np move in the air blowing direction Dw and arrive at the front wire mesh 115. The negative ions and the positive ions that have arrived at the front wire mesh 115 in this manner are partially absorbed by the front wire mesh 115. Therefore, an electric charge corresponding to a difference between the amount of the negative ions and the amount of the positive ions absorbed by the front wire mesh 115 flows from the front wire mesh 115 toward the ground G, and the current Idh due to this electric charge flows to the detection resistor R95. As a result, a voltage Vdh corresponding to the current Idh is generated at a detection point 951 between the detection resistor R95 and the front wire mesh 115. In this manner, the high-response detection circuit 95 converts the current Idh, generated by the electric charge flowing from the front wire mesh 115 to the ground G, into the voltage Vdh by the detection resistor R95. In other words, the high-response detection circuit 95 detects the voltage Vdh indicating ion balance between the negative ions and the positive ions generated by the static eliminator 1 and absorbed by the front wire mesh 115.

Here, a resistance value of the detection resistor R94 of the low-response detection circuit 94 is larger than a resistance value of the detection resistor R95 of the high-response detection circuit 95. Further, the capacitance of the earth E is larger than the capacitance of the front wire mesh 115. Therefore, a time constant of the high-response detection circuit 95 is lower than a time constant of the low-response detection circuit 94, in other words, a response speed of the high-response detection circuit 95 is faster than a response speed of the low-response detection circuit 94. That is, the high-response detection circuit 95 detects a fluctuation of a high frequency out of fluctuations of the ion balance, and the low-response detection circuit 94 detects a fluctuation of a low frequency lower than the high frequency out of the fluctuations of the ion balance.

The electrode unit controller 9 controls the ion balance by executing feedback control on the voltages Vm and Vp to be applied to the electrode needles Nm and Np based on the fluctuations of the ion balance detected by the low-response detection circuit 94 and the high-response detection circuit 95. Specifically, the electrode unit controller 9 includes a second balance control unit 96 that suppresses fluctuations (wobble) of the ion balance, and the feedback control is executed by the second balance control unit 96.

More specifically, the low-response detection circuit 94 outputs the voltage Vdl indicating the fluctuation of the ion balance in the low frequency to the first balance control unit 912 of the CPU 91. The first balance control unit 912 holds a target voltage Vtl which is a target value of the voltage Vdl, generates a voltage signal Vs according to a difference between the voltage Vdl and the target voltage Vtl, and outputs the voltage signal Vs to the second balance control unit 96. Incidentally, the target voltage Vtl is set to zero volt. That is, a target state is a state in which the amount of the negative ions and the amount of the positive ions released from the static eliminator 1 become equal to each other and the electric charge flowing from the earth E into the static eliminator 1 becomes zero.

Further, the high-response detection circuit 95 outputs the voltage Vdh indicating the fluctuation of the ion balance in the high frequency to the second balance control unit 96. In regard to this, the second balance control unit 96 holds a target voltage Vth which is a target value of the voltage Vdh, generates the voltage signal Vim, which is a control signal for performing the feedback control of the voltage Vm according to a difference between the voltage Vdh and the target voltage Vth and the voltage signal Vs, and outputs the voltage signal Vim to the primary-side circuit 921 of the negative polarity high voltage power supply 92. Incidentally, the target voltage Vth is set to not zero volt but a voltage shifted from zero by a predetermined offset voltage. That is, there is a difference between the ease of absorption of the negative ions by the front wire mesh 115 and the ease of absorption of the positive ions by the front wire mesh 115. Therefore, in a target state in which the equal amounts of the negative ions and the positive ions arrive at the front wire mesh 115, the current Idh does not become zero, and the voltage Vdh is shifted by an offset voltage Vo (offset amount) from the voltage (zero volt) of the ground G. Therefore, the target voltage Vth of the voltage Vdh is set to the offset voltage Vo. Note that the offset voltage Vo is experimentally measured in advance and set in the second balance control unit 96.

In this manner, the feedback control for converging the voltage Vdl toward the target voltage Vtl and the feedback control for converging the voltage Vdh toward the target voltage Vth are executed. In other words, the feedback control for converging the current Idl to a target current Itl (=Vtl/R97) and the feedback control for converging the current Idh to a target current Ith (=Vth/R95) are executed. Note that the second balance control unit 96 that executes such control may be configured using an analog circuit such as an operational amplifier or may be configured using a digital circuit such as a processor.

Further, the electrode unit controller 9 executes control for applying voltages Vp and Vm, which are necessary and sufficient for the electrode needles Np and Nm to generate the corona discharges, to the electrode needles Np and Nm using the rear wire mesh 125. More specifically, since the rear wire mesh 125 is short-circuited to the ground G, the electric charge generated in the rear wire mesh 125 flows from the rear wire mesh 125 to the ground G. Note that a mode of electrically connecting the rear wire mesh 125 and the ground G is not limited to the short circuit, and these may be connected via a resistor.

Specifically, along a circuit formed by a corona discharge between the electrode needle Nm and the rear wire mesh 125, a current Irn corresponding to an electric charge generated by the corona discharge flows from the rear wire mesh 125 to the ground G. Further, along a circuit formed by a corona discharge between the electrode needle Np and the rear wire mesh 125, a current Irp corresponding to an electric charge generated by the corona discharge flows from the rear wire mesh 125 to the ground G. On the other hand, the secondary-side circuit 922 of the negative polarity high voltage power supply 92 is connected to the ground G, and the secondary-side circuit 932 of the positive polarity high voltage power supply 93 is connected to the ground G. Therefore, a current Ign mainly including the current Irn reaching the ground G from the rear wire mesh 125 flows from the ground G to the secondary-side circuit 922, and a current Igp mainly including the current Irp reaching the ground G from the rear wire mesh 125 flows from the ground G to the secondary-side circuit 932.

Further, the electrode unit controller 9 also includes a discharge amount detection circuit 97 provided between the secondary-side circuit 932 of the positive polarity high voltage power supply 93 and the ground G. The discharge amount detection circuit 97 includes a detection resistor R97 that connects the secondary-side circuit 932 and the ground G. Therefore, the current Igp flowing from the ground G to the secondary-side circuit 932 flows through the detection resistor R97. As a result, a voltage Vgp corresponding to the current Igp is generated at a detection point 971 between the detection resistor R97 and the secondary-side circuit 932. As described above, the discharge amount detection circuit 97 converts the current Igp, which flows from the rear wire mesh 125 to the secondary-side circuit 932 of the positive polarity high voltage power supply 93 via the ground G, into the voltage Vgp by the detection resistor R97. In other words, the discharge amount detection circuit 97 detects the voltage Vgp indicating an amount of positive ions generated in response to the application of the voltage Vp to the electrode needle Np.

The discharge amount detection circuit 97 outputs the detected voltage Vgp to the high voltage control unit 911 of the CPU 91. The high voltage control unit 911 holds a target voltage Vtp which is a target value of the voltage Vgp, generates the voltage signal Vip which is a control signal for performing the feedback control of the voltage Vp according to a difference between the voltage Vgp and the target voltage Vtp, and outputs the voltage signal Vip to the primary-side circuit 931 of the positive polarity high voltage power supply 93. As a result, the feedback control for converging the voltage Vgp toward the target voltage Vtp is executed. As a result, the positive ions in the amount corresponding to the target voltage Vtp are generated around the electrode needle Np. Note that, as described above, the second balance control unit 96 or the like also executes the feedback control to balance the generation amount of negative ions and the generation amount of the positive ions. Therefore, the negative ions are generated around the electrode needle Nm so as to follow the positive ions generated around the electrode needle Np. As a result, the negative ions in the amount corresponding to the target voltage Vtp are generated around the electrode needle Nm. Such control increases the voltages to be applied to the electrode needles Nm and Np in accordance with the progress of wear of the electrode needles Nm and Np, and the amount of negative ions and the amount of positive ions generated in accordance with the corona discharges by the electrode needles Nm and Np are maintained constant.

Figure 15B:
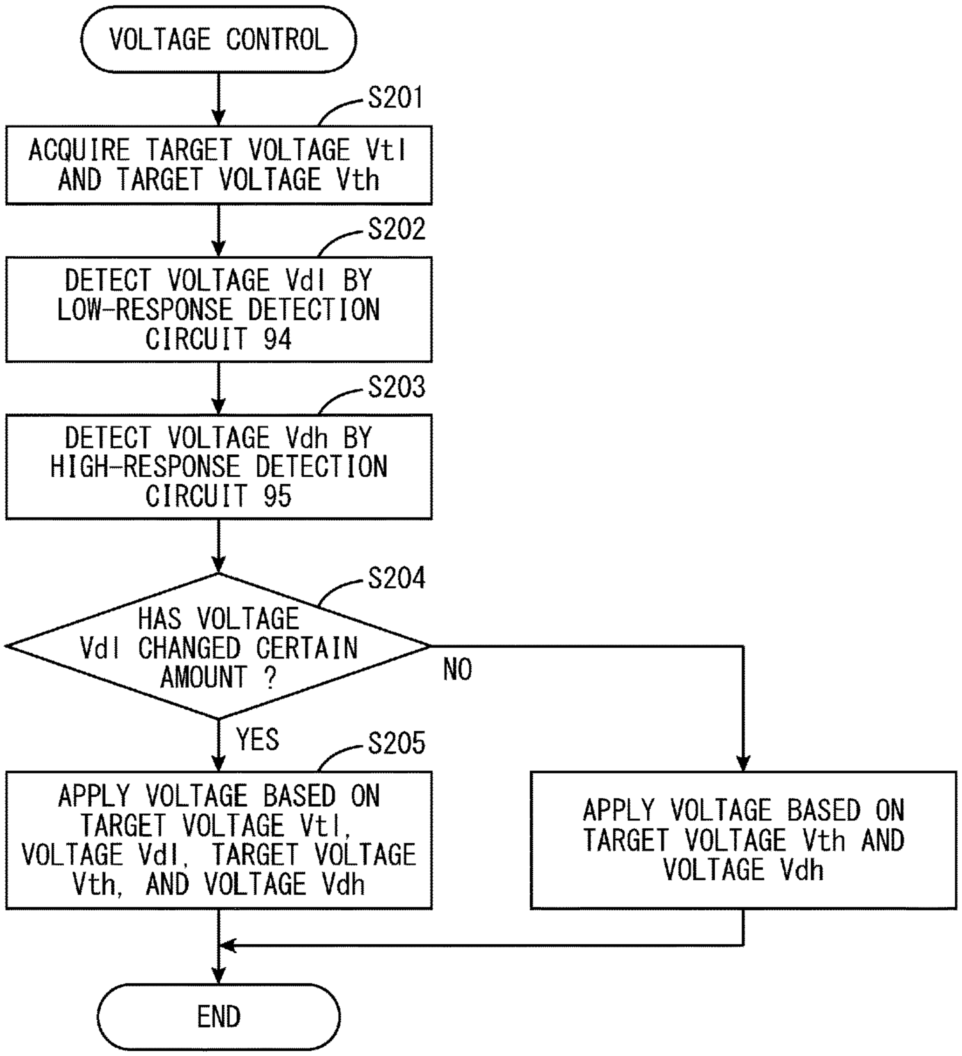
FIG. 15B is a flowchart illustrating an example of voltage control executed in the operation of FIG. 14.

FIG. 15B is a flowchart illustrating an example of the voltage control executed in the operation of FIG. 14. In Step S201, the target voltage Vtl for controlling the ion balance in the long term and the target voltage Vth for controlling the ion balance in the short term are acquired by the first balance control unit 912 and the second balance control unit 96. Then, the voltage Vdl detected by the low-response detection circuit 94 is acquired by the first balance control unit 912 in Step S202, and the voltage Vdh detected by the high-response detection circuit 95 is acquired by the second balance control unit 96 in Step S203. Then, in a case where the voltage Vdl has changed by a certain amount ("YES" in Step S204), the second balance control unit 96 executes the feedback control based on the target voltage Vtl and the voltage Vdl and the feedback control based on the target voltage Vth and the voltage Vdh, and inputs the voltage signal Vim to the negative polarity high voltage power supply 92 (Step S205). On the other hand, in a case where the voltage Vdl has not changed by the certain amount ("NO" in Step S204), the second balance control unit 96 executes the feedback control based on the target voltage Vth and the voltage Vdh, and inputs the voltage signal Vim to the negative polarity high voltage power supply 92 (Step S206).

In the static eliminator 1 described above, the electrode needles Np and Nm (an ion generator) that generate the positive ions and negative ions, and the positive polarity high voltage power supply 93 and the negative polarity high voltage power supply 92 (a high voltage application unit) that apply the voltage Vp (a positive polarity high voltage) and the voltage Vm (a negative polarity high voltage) to the electrode needles Np and Nm are provided. Then, the electrode needle Np generates the positive ions when the positive polarity high voltage power supply 93 applies the voltage Vp to the electrode needle Np, and the electrode needle Nm generates the negative ions when the negative polarity high voltage power supply 92 applies the voltage Vm to the electrode needle Nm. Further, the current Idl (an ion current) flowing between the earth E and the static eliminator 1 via the ground electrode Te is detected, and the feedback control is executed on the negative polarity high voltage power supply 92 such that the current Idl becomes the target current Itl. The ion balance can be appropriately controlled by the feedback control based on the current Idl. Further, the housing 2 is provided with the conductive rear frame 25 (conductive member) in order to suppress charging of the housing 2 of the static eliminator 1. The rear frame 25 is insulated from the placement surface Axy of the static eliminator 1 by the insulators, such as the insulating pads 131, 132, 133, and 134, the inner spacer 16, and the outer spacer 17, so that an electric charge can be prevented from moving from the rear frame 25 to the earth E via the placement surface Axy. In addition, the rear frame 25 is not connected to the earth E, but is connected to a wire electrically connected to each of the low-response detection circuit 94 (a detection circuit), the positive polarity high voltage power supply 93, and the negative polarity high voltage power supply 92, that is, the ground G. As a result, the electric charge of the rear frame 25 is absorbed by the positive polarity high voltage power supply 93 and the negative polarity high voltage power supply 92, so that the electric charge can be prevented from moving from the rear frame 25 to the earth E. As a result, it is possible to suppress the charging of the housing 2 of the static eliminator 1 while avoiding an influence on the control of the ion balance. Incidentally, the ground G can be configured using a wire made of metal such as copper.

Further, the insulating pads 131, 132, 133, and 134 (a support member), which have insulating properties and are attached to the rear frame 25 on the bottom surface 2B of the housing 2 are provided. In a state in which the housing 2 is placed on the placement surface Axy, the insulating pads 131, 132, 133, and 134 are in contact with the placement surface Axy between the rear frame 25 and the placement surface Axy to separate the rear frame 25 from the placement surface Axy. In such a configuration, the rear frame 25 and the placement surface Axy are separated from each other by the insulating pads 131, 132, 133, and 134 each of which has the insulating property and is attached to the rear frame 25 on the bottom surface 2B of the housing 2, so that the electric charge can be prevented from moving from the rear frame 25 to the earth E via the placement surface Axy.

Further, the support fitting 14 made of metal and the fitting attachment portion 15 that rotatably supports the support fitting 14 with respect to the rear frame 25 on the side surface of the housing 2 are provided. The support fitting 14 comes into contact with the placement surface Axy and supports the housing 2 with respect to the placement surface Axy, thereby separating the housing 2 from the placement surface Axy. Further, the fitting attachment portion 15 includes the insulating inner spacer 16 (first spacer) that is arranged between the rear frame 25 and the support fitting 14 on the side surface of the housing 2 and restricts the contact between the rear frame 25 and the support fitting 14. In such a configuration, the contact between the rear frame 25 and the support fitting 14 in contact with the placement surface Axy is restricted by the inner spacer 16, so that the electric charge can be prevented from moving from the rear frame 25 to the earth E via the support fitting 14 and the placement surface Axy.

Further, the fitting attachment portion 15 further includes the insulating outer spacer 17 (second spacer) abutting on the support fitting 14 from the opposite side (outer side) of the inner spacer 16, and the screw 18 made of metal. The through holes 161, 144, and 173 (insertion holes) into which the shaft portion 181 of the screw 18 is inserted are opened in the inner spacer 16, the support fitting 14, and the outer spacer 17, respectively, and the inner spacer 16, the support fitting 14, and the outer spacer 17 are fastened to the housing 2 by the screw 18 in the state of being sandwiched between the head portion 182 of the screw 18 and the rear frame 25. On the other hand, the outer spacer 17 has the spacer body 171 and the protruding portion 172 protruding from the spacer body 171 to the inner spacer 16 side (inner side). The spacer body 171 is located between the head portion 182 of the screw 18 and the support fitting 14 to restrict the contact between the head portion 182 of the screw 18 and the support fitting 14, and the protruding portion 172 is located between the peripheral edge of the through hole 144 provided in the support fitting 14 and the shaft portion 181 of the screw 18 to restrict the contact between the support fitting 14 and the shaft portion 181 of the screw 18. In such a configuration, the contact between the metal screw 18 for fastening the support fitting 14 to the housing 2 and the support fitting 14 is restricted by the outer spacer 17. Therefore, even if the rear frame 25 and the screw 18 come into contact with each other, the electric charge can be prevented from moving from the rear frame 25 to the support fitting 14 via the screw 18, and eventually, it is possible to prevent the movement of the electric charge from the rear frame 25 to the earth E.

As described above, in the present embodiment, the static eliminator 1 corresponds to an example of a "static eliminator" of the invention; the insulating pads 131, 132, 133, and 134 correspond to examples of a "support member" of the invention; the support fitting 14 corresponds to an example of a "support fitting" of the invention; the fitting attachment portion 15 corresponds to an example of a "fitting attachment portion" of the invention; the inner spacer 16 corresponds to an example of a "first spacer" of the invention; the through holes 161, 144, and 173 correspond to examples of "insertion holes" of the invention; the outer spacer 17 corresponds to an example of a "second spacer" of the invention; the spacer body 171 corresponds to an example of a "spacer body" of the invention; the protruding portion 172 corresponds to an example of a "protruding portion" of the invention; the screw 18 corresponds to an example of a "screw" of the invention; the shaft portion 181 corresponds to an example of a "shaft portion" of the invention; the head portion 182 corresponds to an example of a "head portion" of the invention; the housing 2 corresponds to an example of a "housing" of the invention; the rear frame 25 corresponds to an example of a "conductive member" of the invention; the positive polarity high voltage power supply 93 and the negative polarity high voltage power supply 92 cooperate to function as an example of a "high voltage application unit" of the invention; the low-response detection circuit 94 corresponds to an example of a "detection circuit" of the invention; the second balance control unit 96 corresponds to an example of a "feedback control unit" of the invention; the earth E corresponds to an example of an "earth" of the invention; the ground G corresponds to an example of a "wire" of the invention; the current Idl corresponds to an example of an "ion current" of the invention; the target current Ith corresponds to an example of a "target value" of the invention; the electrode needles Np and Nm correspond to examples of an "ion generator" of the invention; the ground electrode Te corresponds to an example of a "ground electrode" of the invention; the voltage Vp corresponds to an example of a "positive polarity high voltage" of the invention; and the voltage Vm corresponds to an example of a "negative polarity high voltage" of the invention.

Note that the invention is not limited to the above-described embodiments and various modifications can be made to those described above without departing from the gist thereof. For example, the specific configuration of the conductive member that imparts conductivity to the housing 2 is not limited to the antistatic member, and may be metal or a conductive resin.

Further, in the housing 2, the conductivity may be imparted to a member other than the rear frame 25, for example, the front frame 21. In this case, the rear frame 25 may be an insulator.

Further, the first unit frame 51 and the second unit frame 61 do not need to have an arc shape, and may have a circular shape.

Further, an arrangement mode of the electrode needles Nm and Np in the first and second unit frames 51 and 61 may be changed. For example, the electrode needles Nm and Np may be provided so as to protrude outward from the outer walls 512 and 612 of the first and second unit frames 51 and 61.

Further, the number or the arrangement mode of the electrode needles Nm and Np may be appropriately changed.

Further, an arrangement order of the negative electrode unit 5 and the positive electrode unit 6 in the X direction may be reversed.

Further, the fan unit 3 may be arranged on the upstream side of the negative electrode unit 5 and the positive electrode unit 6 in the air blowing direction Dw.

Further, specific contents of the control of a generation amount of ions executed by the high voltage control unit 911 are not limited to the above example. That is, the generation amount of ions may be controlled by performing the feedback control on the voltage Vm based on the current Ign flowing from the ground G to the secondary-side circuit 922 of the negative polarity high voltage power supply 92.

Further, the control for generating the predetermined amount of ions regardless of the progress of wear of the electrode needles Nm and Np (control by the high voltage control unit 911) is executed on the positive polarity high voltage power supply 93, and the control for realizing appropriate ion balance (control by the second balance control unit 96) is executed on the negative polarity high voltage power supply 92. However, the former control may be executed on the negative polarity high voltage power supply 92, and the latter control may be executed on the positive polarity high voltage power supply 93.

Further, two types of the electrode needles Np and Nm to which different DC voltages Vp and Vm are applied are provided, and the positive ions are generated by the electrode needle Np, and the negative ions are generated by the electrode needle Nm. However, positive ions and negative ions may be generated by corona discharges generated by applying an AC voltage, which varies with time between the voltage Vp and the voltage Vm, to one type of electrode needle.

Figure 16:
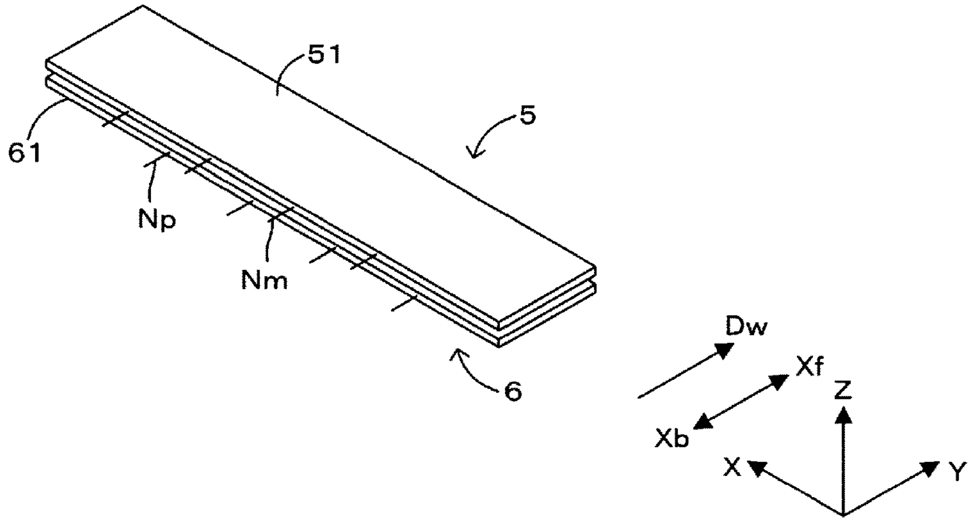
FIG. 16 is a perspective view schematically illustrating a modified example of the negative electrode unit and the positive electrode unit.

Further, the negative electrode unit 5 and the positive electrode unit 6 may be configured as illustrated in FIG. 16.

FIG. 16 is a perspective view schematically illustrating a modified example of the negative electrode unit and the positive electrode unit. In the modified example illustrated in FIG. 16, the negative electrode unit 5 includes the first unit frame 51 having a flat plate shape extending in the Y direction, and the plurality electrode needles Nm are arrayed in the Y direction on a rear end surface of the first unit frame 51. Each of the electrode needles Nm protrudes from the rear end surface of the first unit frame 51 to the rear side Xb in the X direction. Further, the positive electrode unit 6 includes the second unit frame 61 having a flat plate shape extending in the Y direction, and the plurality of electrode needles Np are arrayed in the Y direction on a rear end surface of the second unit frame 61. Each of the electrode needles Np protrudes from the rear end surface of the second unit frame 61 to the rear side Xb in the X direction. The electrode needle Nm and the electrode needle Np generate negative ions and positive ions in response to application of a voltage. The negative ions and the positive ions are released from the static eliminator 1 by air in the air blowing direction Dw parallel to the X direction.

Further, the static eliminator 1 described above is provided with the system performing the feedback control of ion balance in the long term and the system performing the feedback control of ion balance in the short term. A specific configuration for executing such two feedback control systems is not limited to the example of FIG. 15A. That is, any configuration that realizes the two feedback systems conceptually illustrated in FIG. 17 can be adopted.

Figure 17:
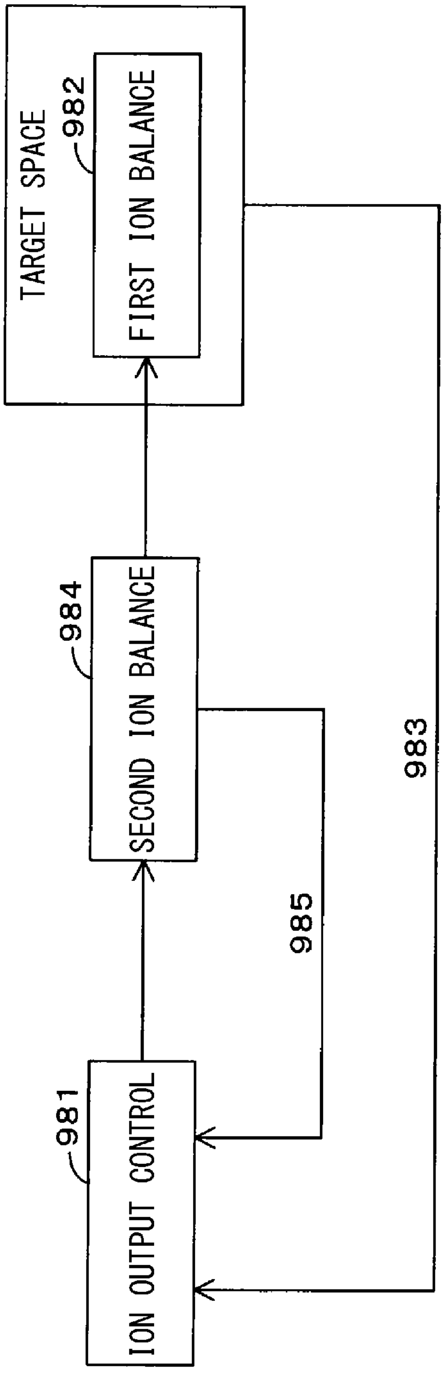
FIG. 17 is a diagram schematically illustrating two systems that perform long-term feedback and short-term feedback.

FIG. 17 is a diagram schematically illustrating two systems that perform long-term feedback and short-term feedback. Positive ions and negative ions whose ion balance is controlled by ion output control 981 are emitted from the housing 2 to an external target space via the front cover 11. Then, first ion balance 982 indicating the ion balance in the target space is detected, and the first ion balance 982 is fed back to the ion output control 981 by a feedback loop 983. The ion output control 981 executes long-term feedback control (that is, feedback control with a low response speed) for bringing the first ion balance 982 closer to a target value on the ion balance released from the ion output control 981.

Further, second ion balance 984 indicating ion balance at a position (for example, the inner side of the front cover 11) different from the first ion balance 982 is detected, and the second ion balance 984 is fed back to the ion output control 981 by a feedback loop 985. The ion output control 981 executes short-term feedback control (that is, feedback control with a high response speed) based on the second ion balance 984 on the ion balance released from the ion output control 981.

That is, first feedback control based on the first ion balance 982 and second feedback control based on the second ion balance 984 are executed, and the responsiveness of the second feedback control is higher than the responsiveness of the first feedback control. As a result, the ion balance can be appropriately maintained in the long term and the short term.

Figure 18:
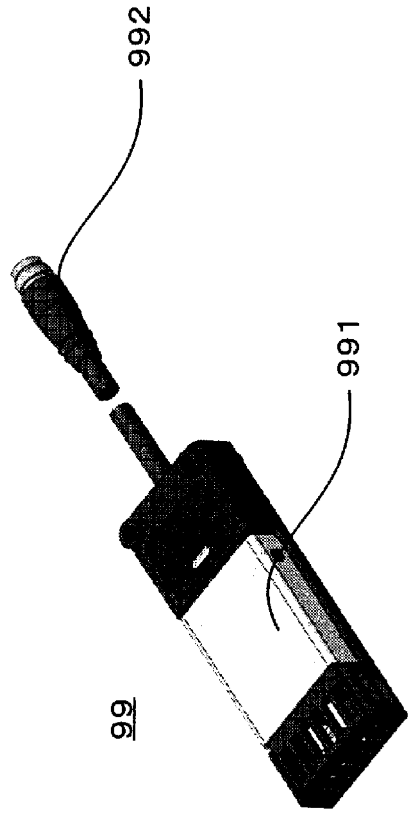
FIG. 18 is a perspective view illustrating an example of an ion balance sensor.

Further, an ion balance sensor illustrated in FIG. 18 may be used to execute long-term feedback control. FIG. 18 is a perspective view illustrating an example of the ion balance sensor. An ion balance sensor 99 of FIG. 18 includes a sensor plate 991 that detects ion balance and an output terminal 992 that outputs a current (first ion current) according to the ion balance detected by the sensor plate 991. At least the sensor plate 991 of the ion balance sensor 99 is arranged at an external detection position outside a device body of the static eliminator 1 including the housing 2 and the front cover 11. Then, the ion balance (that is, the first ion balance 982) at the external detection position is detected by the sensor plate 991, and the first ion current is output from the output terminal 992. The first ion current output from the output terminal 992 is fed back to the ion output control 981 by the feedback loop 983.

Note that, in a case where the ion balance sensor 99 is used for the electrode unit controller 9 in FIG. 15A, the first ion current output from the output terminal 992 of the ion balance sensor 99 is input to, for example, a detection resistor provided in parallel with the detection resistor R94, and the first ion current is converted into a voltage by the detection resistor. Then, feedback control is executed by the first balance control unit 912 and the second balance control unit 96 such that the voltage corresponding to the first ion current becomes a predetermined target voltage (in other words, the first ion current becomes a predetermined target current). Note that the voltage Vdl obtained by converting the current Idl from the earth E is not reflected in the feedback control and is ignored. That is, the first balance control unit 912 and the second balance control unit 96 execute the long-term feedback control based on the first ion current detected by the ion balance sensor 99, instead of the current Idl from the earth E.

The invention is applicable to all the techniques for releasing ions generated by applying a voltage to an electrode to an object to eliminate static electricity of the object.

What is claimed is:

1. A static eliminator that releases ions to an object to eliminate static electricity of the object, the static eliminator comprising:

an ion generator that generates a corona discharge in response to application of a positive polarity high voltage to generate positive ions, and generates a corona discharge in response to application of a negative polarity high voltage to generate negative ions;

a high voltage application unit that applies the positive polarity high voltage and the negative polarity high voltage to the ion generator;

a ground electrode short-circuited to an earth;

a detection circuit that detects an ion current flowing between the earth and the static eliminator via the ground electrode;

a feedback control unit that executes feedback control on the high voltage application unit to make the ion current detected by the detection circuit be a predetermined target value;

a wire electrically connected to each of the detection circuit and the high voltage application unit; and a housing having a conductive member, which is insulated from a placement surface on which the static eliminator is placed and electrically connected to the wire, the housing accommodating the detection circuit.

2. The static eliminator according to claim 1, further comprising a support member that has an insulating property and is attached to the conductive member on a bottom surface of the housing, wherein, in a state in which the static eliminator is placed on the placement surface, the support member is in contact with the placement surface between the conductive member and the placement surface to separate the conductive member from the placement surface.

3. The static eliminator according to claim 1, further comprising:

a support fitting made of metal; and a fitting attachment portion that rotatably supports the support fitting with respect to the conductive member on a side surface of the housing, wherein the support fitting comes into contact with the placement surface and supports the housing with respect to the placement surface to separate the housing from the placement surface, and the fitting attachment portion includes a first spacer that has an insulating property, is arranged between the conductive member and the support fitting on the side surface of the housing, and restricts contact between the conductive member and the support fitting.

4. The static eliminator according to claim 3, wherein the fitting attachment portion further includes: a second spacer that has an insulating property and abuts on the support fitting from an opposite side of the first spacer; and a screw made of metal, and an insertion hole into which a shaft portion of the screw is inserted is opened in each of the first spacer, the support fitting, and the second spacer, the first spacer, the support fitting, and the second spacer are fastened to the housing by the screw in a state of being sandwiched between a head portion of the screw and the conductive member, the second spacer includes a spacer body and a protruding portion protruding from the spacer body toward the first spacer, the spacer body is located between the head portion and the support fitting to restrict contact between the head portion and the support fitting, and the protruding portion is located between a peripheral edge of the insertion hole provided in the support fitting and the shaft portion to restrict contact between the support fitting and the shaft portion.

5. The static eliminator according to claim 1, wherein the conductive member is an antistatic member made of an antistatic resin.

6. The static eliminator according to claim 1, further comprising:

a fan that causes the ions to be released from the static eliminator, the ions being generated from the ion generator; and a front wire mesh electrically connected to the wire and located a downstream side of the fan in a flow path formed by the fan.

7. The static eliminator according to claim 6, wherein the front wire mesh is electrically connected to the wire via a detection resistor.

8. The static eliminator according to claim 1, further comprising:

a fan that causes the ions to be released from the static eliminator, the ions being generated from the ion generator; and a rear wire mesh electrically connected to the wire and located an upstream side of the fan in a flow path formed by the fan.

9. The static eliminator according to claim 8, wherein a corona discharge is generated between the rear wire mesh and the ion generator.

10. The static eliminator according to claim 1, further comprising a fan that causes the ions to be released from the static eliminator, the ions being generated from the ion generator wherein the housing includes a cover frame that guides air blown by the fan and is made of an antistatic resin.

11. The static eliminator according to claim 1, wherein the wire is a ground of the high voltage application unit.

* * * * *